Oct. 20, 1942.   H. F. ELLIOTT   2,299,082
ELECTRIC CONTROL APPARATUS
Filed Dec. 3, 1940   8 Sheets-Sheet 2
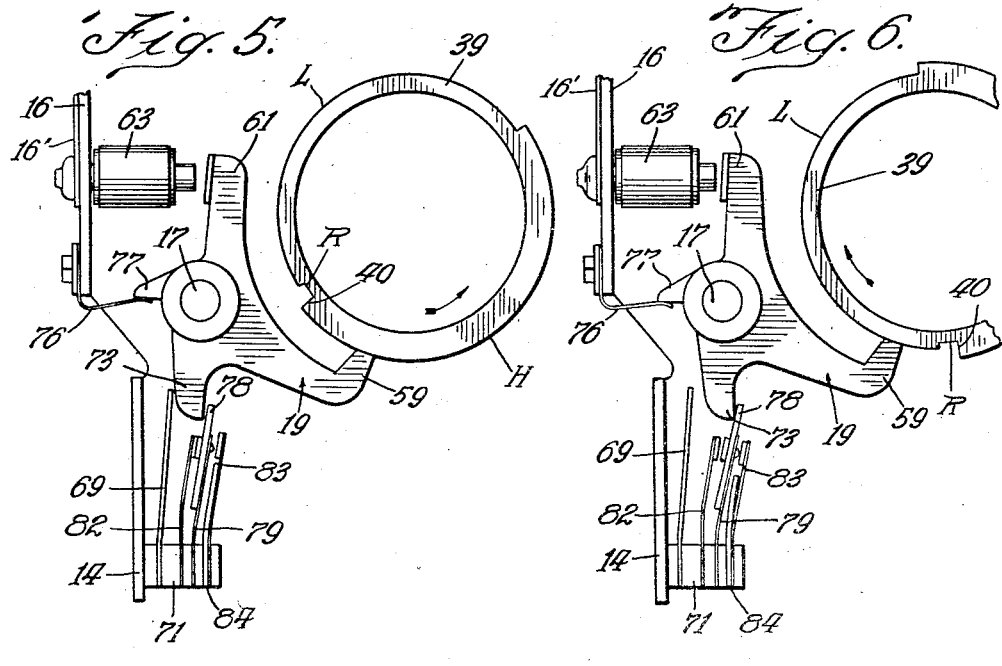
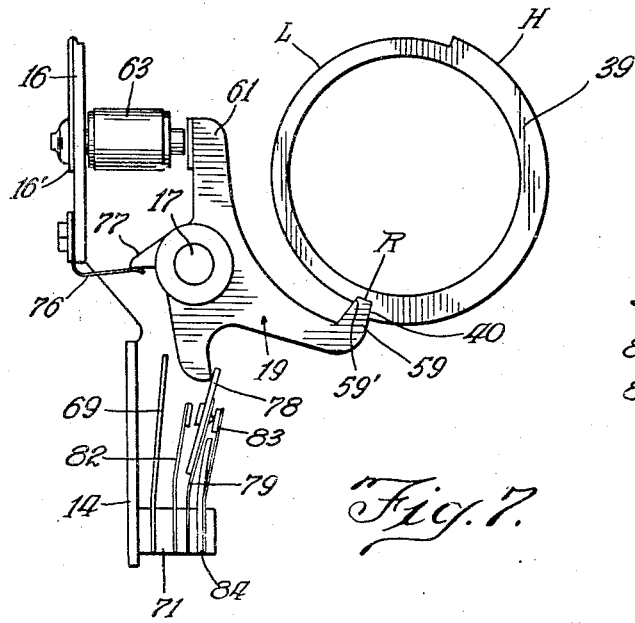
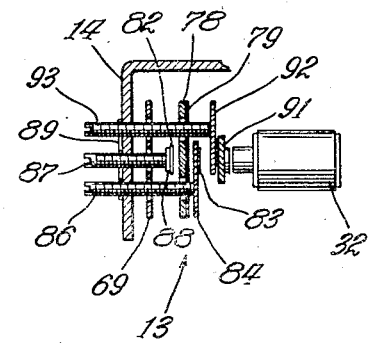
Inventor:
Harold F. Elliott
By Loorman L. Mueller
Atty.

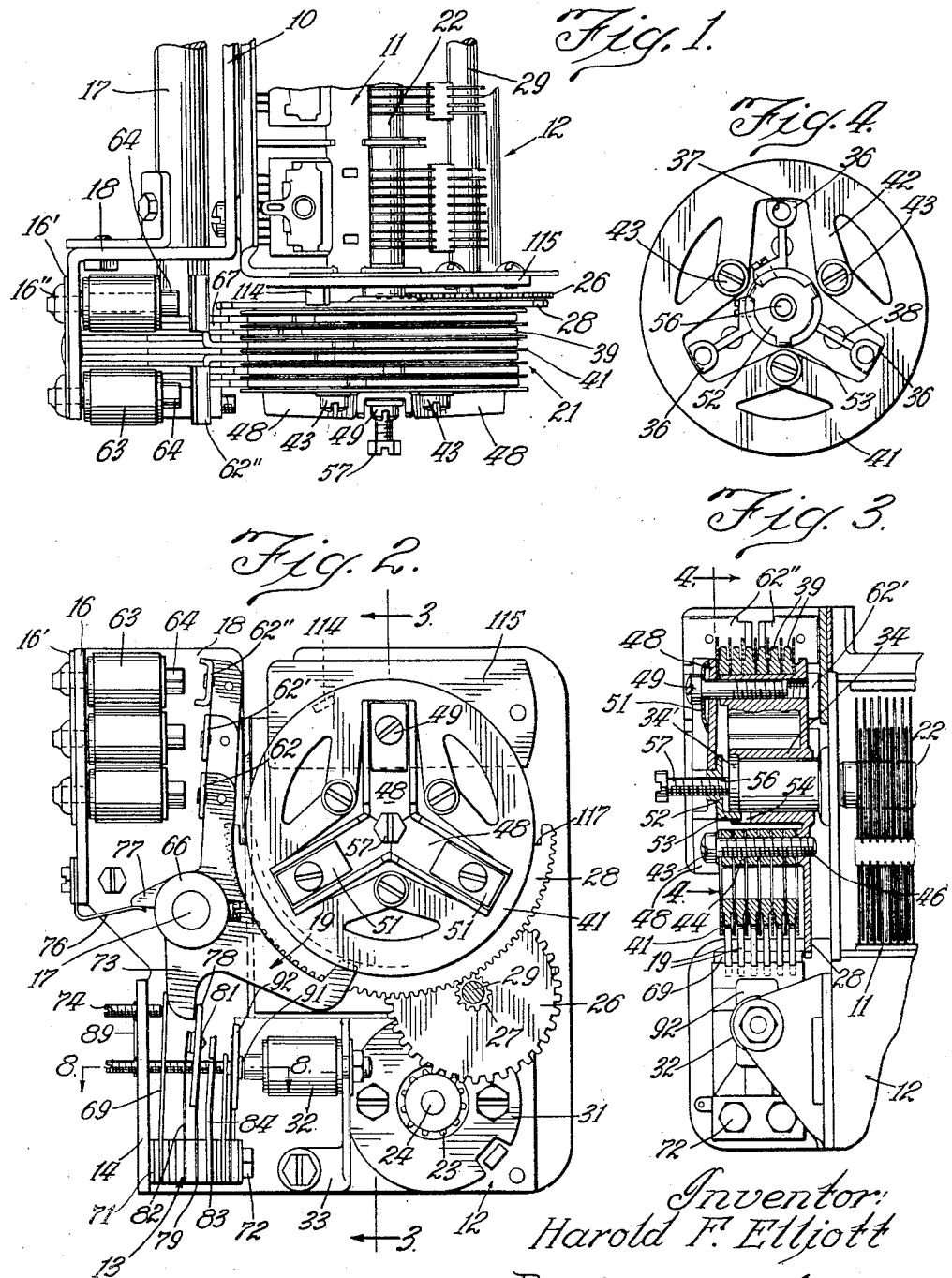

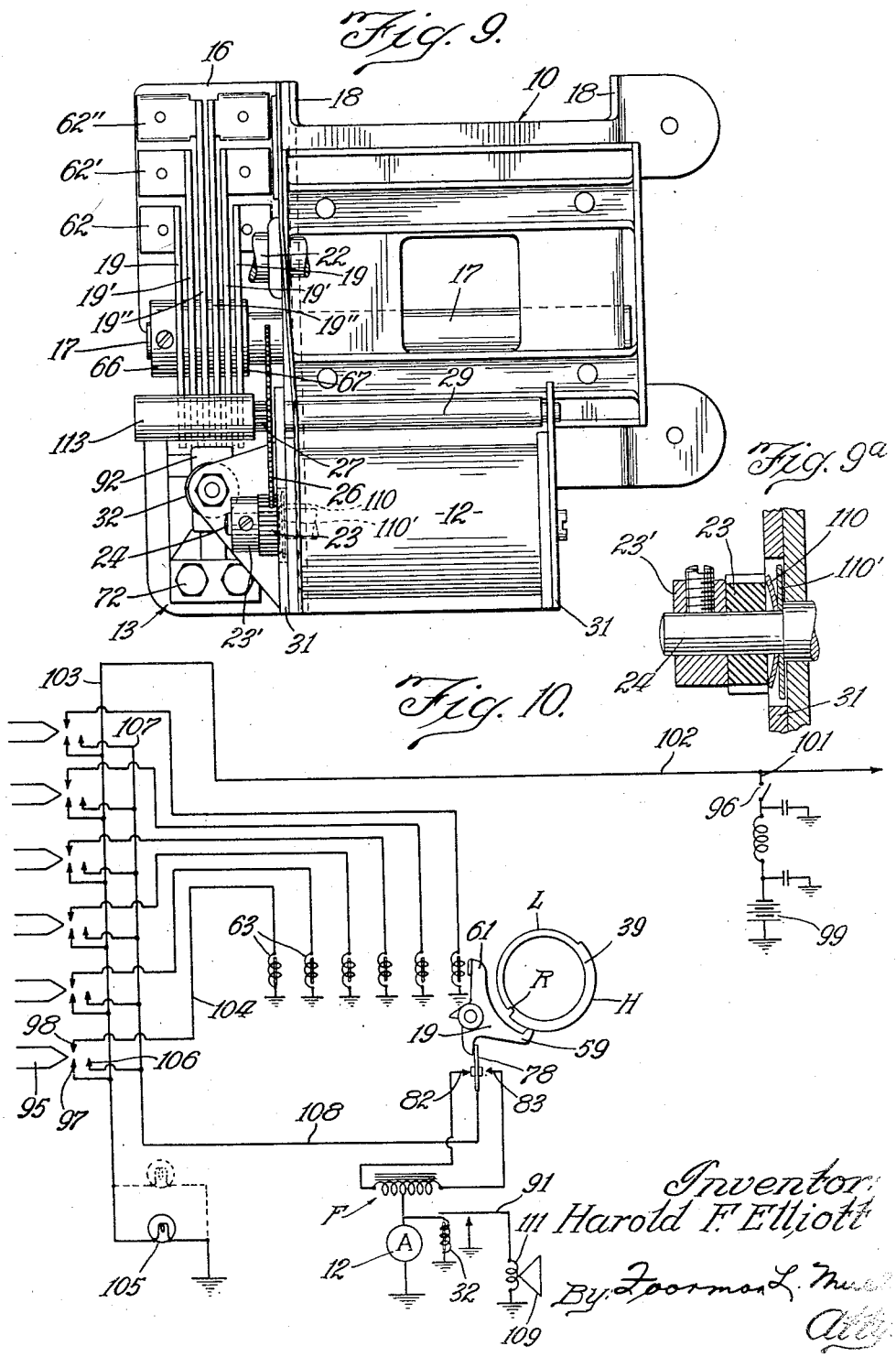

Oct. 20, 1942.　　　H. F. ELLIOTT　　　2,299,082
ELECTRIC CONTROL APPARATUS
Filed Dec. 3, 1940　　　8 Sheets-Sheet 4

Inventor:
Harold F. Elliott
By: Foorman L. Mueller
Atty.

Oct. 20, 1942.   H. F. ELLIOTT   2,299,082
ELECTRIC CONTROL APPARATUS
Filed Dec. 3, 1940    8 Sheets-Sheet 5
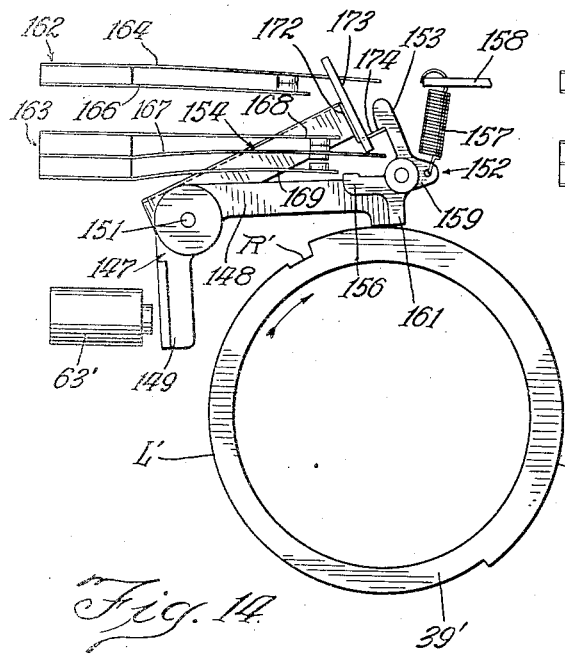
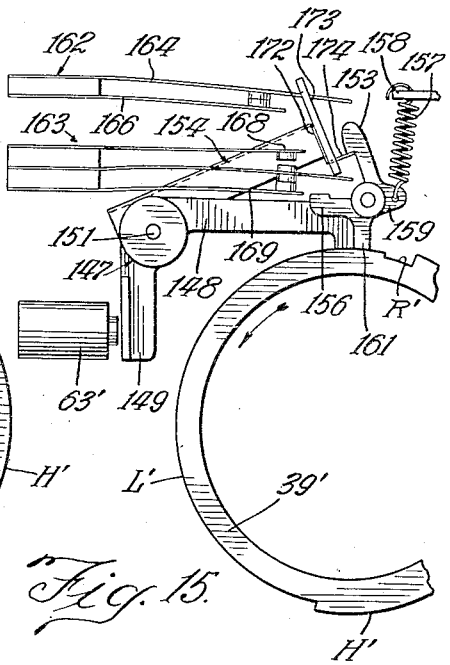
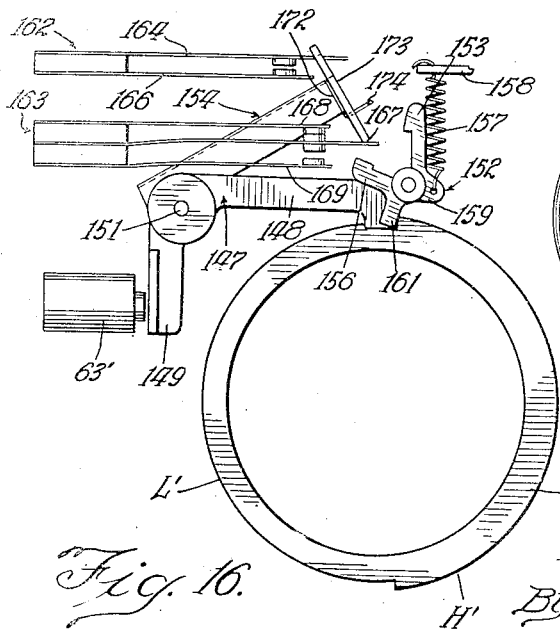
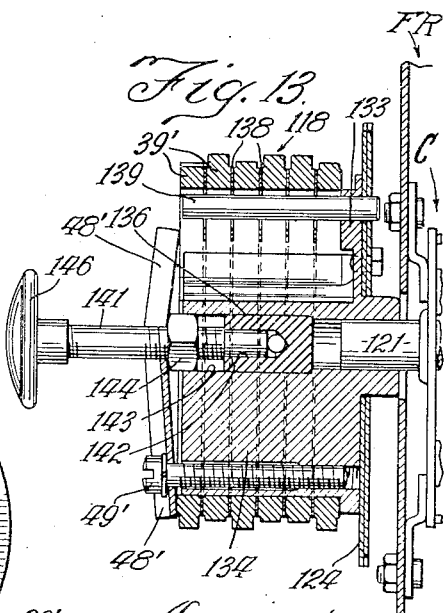
Inventor:
Harold F. Elliott

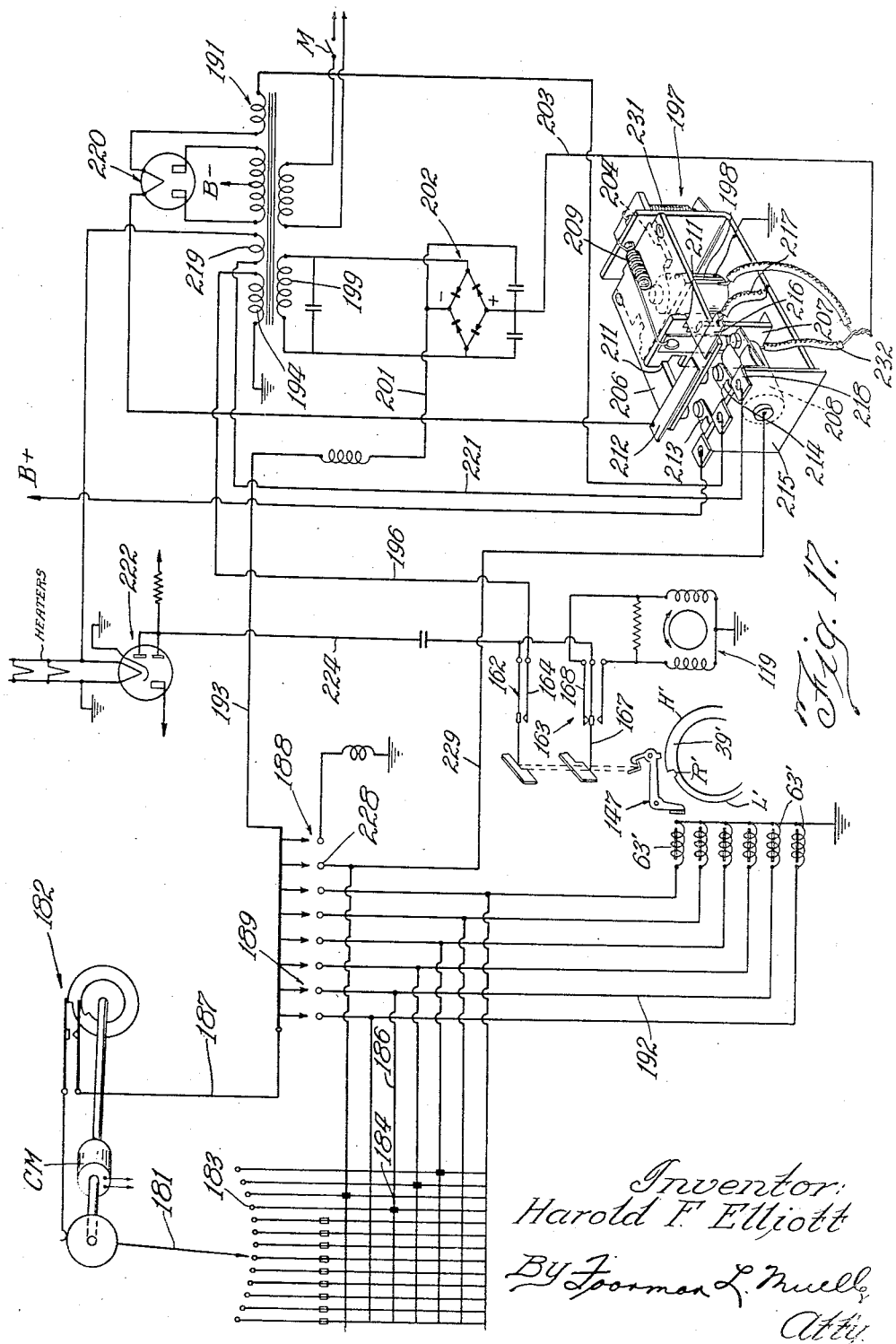

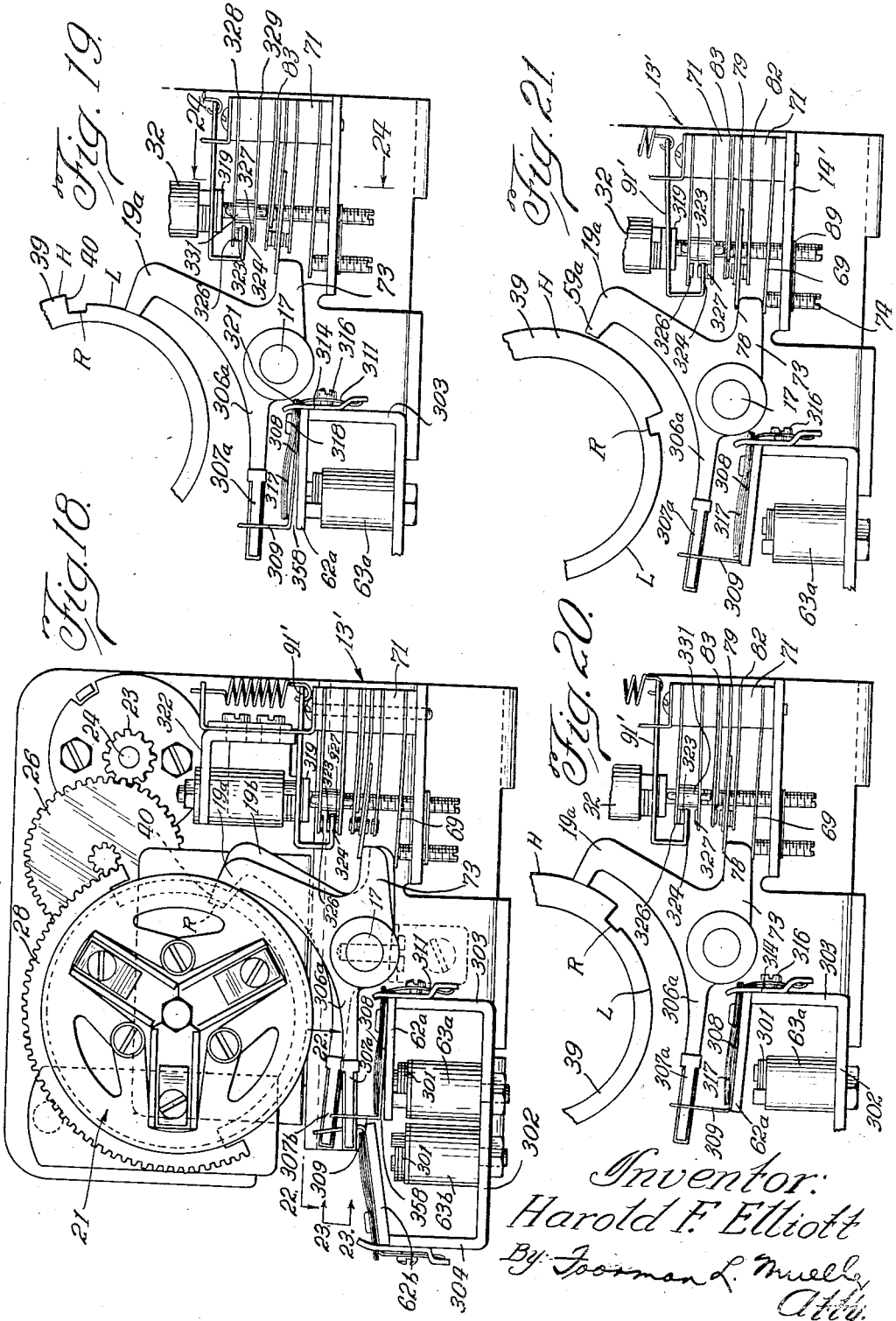

Oct. 20, 1942.   H. F. ELLIOTT   2,299,082
ELECTRIC CONTROL APPARATUS
Filed Dec. 3, 1940   8 Sheets-Sheet 8
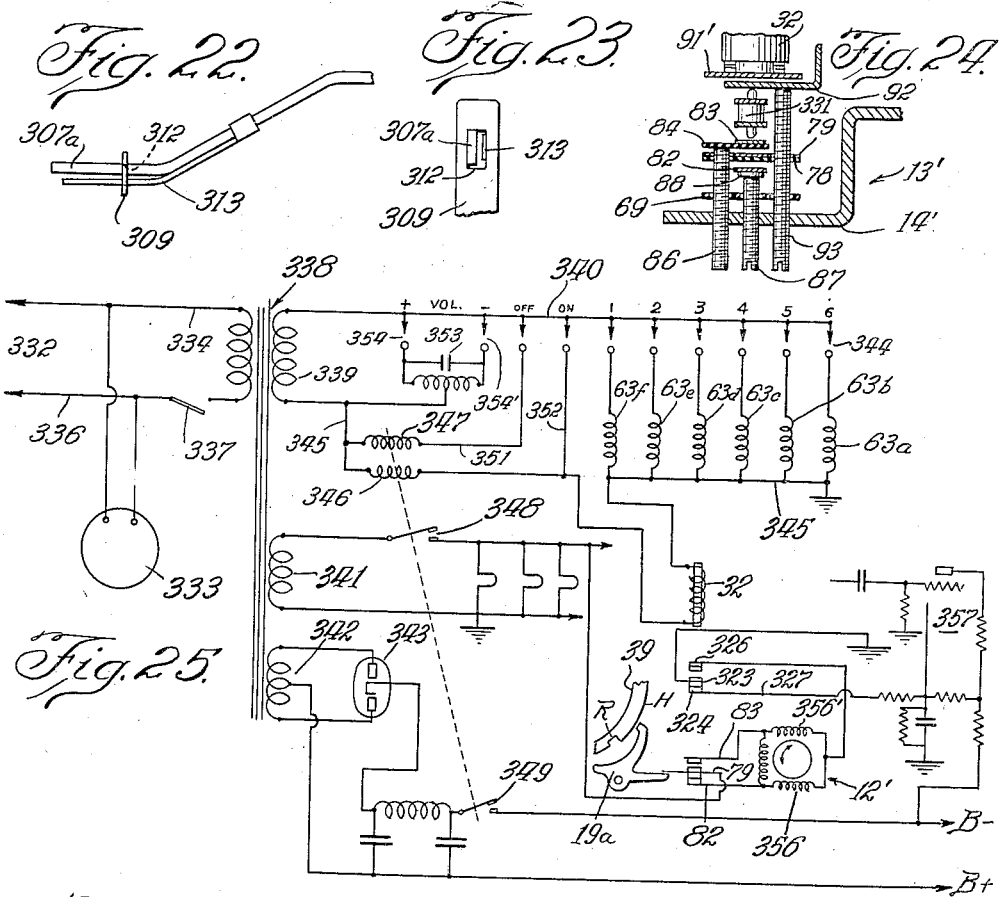
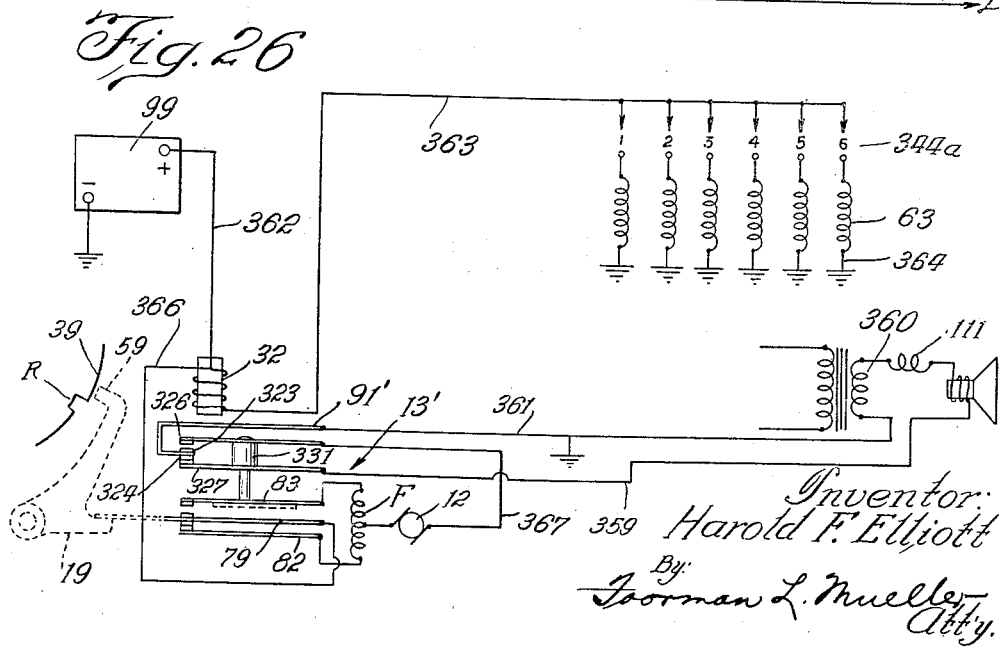
Inventor:
Harold F. Elliott
By Toorman L. Mueller
Atty.

Patented Oct. 20, 1942

2,299,082

UNITED STATES PATENT OFFICE 2,299,082

ELECTRIC CONTROL APPARATUS

Harold F. Elliott, Palo Alto, Calif.

Application December 3, 1940, Serial No. 368,334

22 Claims. (Cl. 192—142)

My invention relates in general to control apparatus and more in particular to electric control apparatus employed in tuning a radio receiver to a plurality of predetermined signal frequencies. This application is a continuation in part of my application Serial No. 277,856 filed June 7, 1939.

A tremendous amount of development work has been carried on for a number of years on electric tuners for radio receivers, and many different structures have been utilized commercially. Although several of these devices have accomplished the actual tuning of a radio receiver in a fairly satisfactory manner, the electric tuners in commercial form have substantially all been complicated and expensive and so large that they took up a considerable amount of space in the radio receiver apparatus to which they were applied. The complicated structure increased the cost of the tuners and in many instances the servicing and maintenance thereon, to such an extent that the complete radio receiver to which the tuner was adapted was out of the popular price classes, and sales thereof were relatively limited. Furthermore, the bulkiness of the tuners of the prior art was such in many instances that it could not be employed in many of the popular priced receivers enjoying large sales because such receivers were relatively small in size as a result of the popular demand as well as the price thereof. In addition, the prior tuners operated relatively slowly, in fact so slowly that they normally required holding circuits operable during the tuning operation, which increased the complexity and cost of the devices. The slow operation was not attractive to the operator.

It is an object of my invention to provide improved electrically operated control apparatus which can be readily applied to many types of controllable mechanism including automobile radio receivers, and radio receivers for home use.

A further object of my invention is to provide a compact, simple, rugged, and inexpensive electrically operated control apparatus.

A still further object is to provide electric control apparatus which operates very quickly and positively, and which can be quickly and simply adjusted to various predetermined control positions without the use of special tools or the like.

One of the features of my invention is the provision of the control apparatus in a preassembled unit which can be completely assembled and tested under operating conditions before it is ever assembled into the structure for which it is adapted.

Another feature of my invention is the provision of a rotary control unit having magnetically operated pivoted latches acting with control rings in the complete control operation, in which the latches, control rings and armatures for the magnets are of one size and formed of metal stampings whereby to reduce manufacturing costs of the unit to a minimum.

Yet another feature of my invention is the provision of a rotary control unit having magnetically operated pivoted latches acting with control rings in the complete control operation, in which the latches and associated magnet structures are angularly spaced about the control unit whereby to provide for a standardization and consequent reduction in the cost of the magnet structures.

A still further feature of my invention is the provision of a tuning unit having a reversible driving motor in which a relay switch operates to close the motor energizing circuit and to mute the receiver during a tuning operation and to shut off the motor and to open the receiver on completion of the tuning operation.

Yet another feature of my invention is the provision of a tuning unit which includes frequency changing means adapted for operation by a unidirectional rotating control shaft, in which the frequency changing means is rotated from a closed position to an open starting position by about a quarter revolution of the control shaft. The control shaft is in operative association with a switch which functions to turn the receiver off during this period of condenser rotation. This provides a simple and inexpensive means for automatically turning the set off and on during a tuning operation and saves the cost of a power relay.

The compactness of the complete tuner of my invention and particularly that of the control ring assembly is an important feature of my invention. The illustrations in Figs. 1 to 3 are made full size as to a commercial embodiment of the invention, and a second commercial embodiment is illustrated in Figs. 11 to 13 in actual size.

A still further feature of my invention is the provision of pivoted latches acting with the control rings in the complete control operation, with the arms all pivoted from the same shaft and each having a ring stopping portion in alignment with one another on a line parallel to the pivot shaft, and yet provided in a varied shape and size as to their remaining structure so that solenoids acting to pivot the latches can be arranged in the most compact and simple manner to take up the smallest possible space therefor.

Other objects and features of my invention will be apparent from the following description taken with the drawings, in which:

Fig. 1 is a top plan view of my complete control device in a preassembled unit;

Fig. 2 is a front elevation thereof;

Fig. 3 is a vertical sectional view approximately along the line 3—3 of Fig. 2;

Fig. 4 is a detail elevational view of a separator disc for limiting the axial movement of a control ring, and one of the elements for varying the friction on such disc and ring, taken along the line 4—4 of Fig. 3;

Fig. 5 is a detailed, somewhat diagrammatic illustration of a control ring, a pivoted latch, and the switch and solenoid structure associated therewith. In this figure the latch is shown on the high side of the control ring with the operating switch in a corresponding position, as contrasted to the idle position for this structure in Fig. 2;

Fig. 6 is a view similar to Fig. 5, showing the same structure in operating position, with a latch on the low side of the control ring;

Fig. 7 illustrates the same structure with the latch and control ring in stopped position, which is the same regardless of whether the control ring rotates in a direction corresponding to the high side or the low side thereof;

Fig. 8 is a detailed sectional view approximately along the line 8—8 of Fig. 2, showing the adjusting screws and associated switch elements adjusted by such screws;

Fig. 9 is an elevational view of the preassembled unit looking to the left in Fig. 1, with the control ring assembly and the rotor and and stator plates of the variable condenser omitted for purposes of clarity in illustration;

Fig. 9a is an enlarged detail view of the slip clutch for the device of Figs. 1 to 10;

Fig. 10 is a schematic illustration of a circuit for one adaptation of my invention as embodied in Figs. 1 to 9, inclusive;

Fig. 13 is a fragmentary sectional view approximately along the line 13—13 of Fig. 11;

Fig. 14 is an illustration similar to that of Fig. 5, showing the control ring of the modification with a pivoted latch in the high side of the ring and contrasted to the idle position for the latch and switch in Fig. 11;

Fig. 15 is an illustration similar to Fig. 14, with the pivoted latch on the low side of a control ring;

Fig. 16 illustrates the pivoted latch in stopped position on the control ring and the switch structure in a corresponding position;

Fig. 17 is a schematic illustration of a circuit diagram for one adaptation of a modified structure of Figs. 11 to 16, inclusive;

Fig. 18 illustrates the tuning unit of Fig. 2 with a switch mechanism adapted for operation with alternating current;

Fig. 19 is a detailed, somewhat diagrammatic illustration of a control ring with the latch on the low side of the control ring and the solenoid structure in its closed position;

Fig. 20 is a view similar to Fig. 19 showing the latch on the high side of the control ring with the solenoid structure associated therewith in an energized condition;

Fig. 21 illustrates the same structure in its rest position;

Fig. 22 is a fragmentary sectional view of a latch portion as seen along the line 22—22 in Fig. 18;

Fig. 23 is a fragmentary view of a latch portion as seen along the line 23—23 in Fig. 18;

Fig. 24 is a sectional view taken along the line 24—24 in Fig. 19;

Fig. 25 illustrates somewhat diagrammatically a control circuit for the tuner of Fig. 18 when operating with alternating current; and Fig. 26 illustrates somewhat diagrammatically a control circuit for the tuner of Fig. 18 when operating with direct current.

Figure 11:
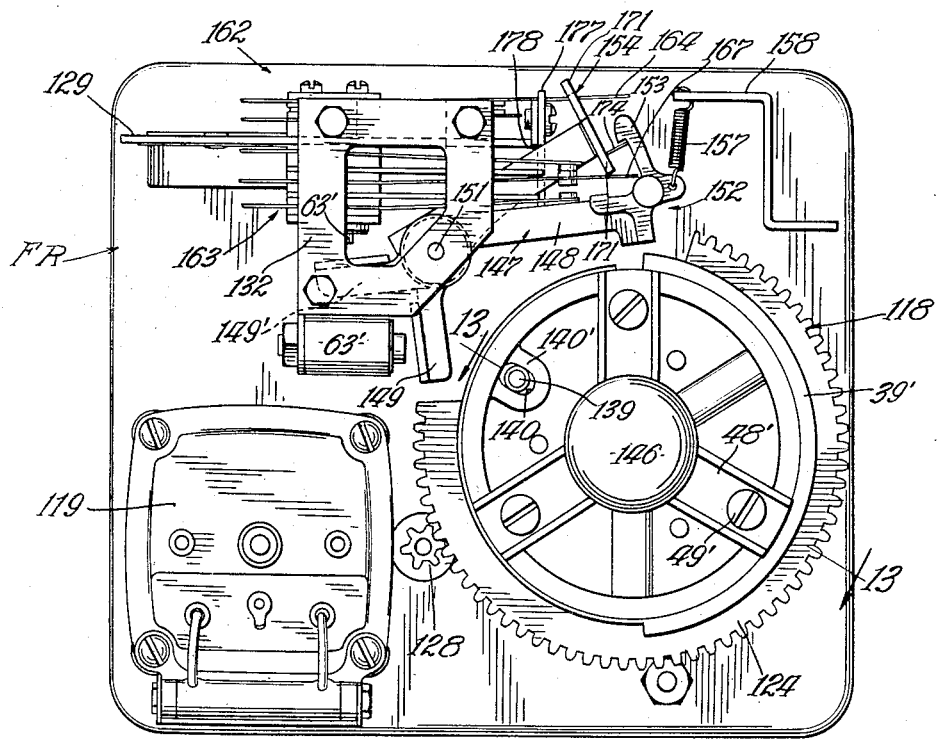
Fig. 11 is a front elevation of a modification of my invention.

In practicing my invention I provide a frame for a preassembled radio tuning control unit which includes resonant frequency changing structure such as a variable condenser mounted on the frame, and a rotary control assembly angularly adjustably supported on a rotary shaft journaled in the frame and operatively connected with the resonant frequency changing structure of the complete unit. Control rings in the control assembly are normally frictionally held against rotation relative to their supporting hub and rotary shaft, but the friction can be removed and the rings individually and independently rotated relative to the hub to a position corresponding to a predetermined signal frequency. With the control rings then frictionally retained against rotation, the control assembly and the resonant frequency changing structure therewith are rotated by suitable driving means, such as an electric motor through the various predetermined tuning positions where each control ring, as it is selected for a tuning operation, is stopped mechanically by a pivoted latch riding on the circumference of the control ring. Each pivoted latch is selectively brought into engagement with a corresponding control ring upon pushing a control button or otherwise closing an operating switch and circuit to energize a solenoid therefor. The energizing circuit can be closed at the radio receiver or from a remote position. Rotation of the control ring assembly by the electric motor continues until the latch engages a recess in the selected control, which has been previously adjusted in position to correspond to a desired signal frequency. The button switch or some other operating switch is held closed during this entire tuning operation and when released at the stop position for the control ring, opens the driving motor circuit.

Referring now to the drawings, a substantially U-shaped one-piece frame 10 supports a variable condenser 11 and a motor 12. These portions of the complete unit are supported on the body portion of the frame and a switch portion, indicated generally by the reference character 13, is supported on a frame extension 14, and another frame extension 16 supports the operating solenoids for the pivoted latches, as will be hereinafter explained. A relatively heavy rod or bar 17 is fixedly supported in the two legs 18 of the frame 10 with one end of the shaft extending beyond its adjacent frame leg 18 for pivotally supporting thereon all of the latches as 19. The adjustable and rotatable control assembly 21 is mounted on an extension of the condenser shaft 22, or a second shaft coupled thereto, and such control assembly and the rotor plates of the variable condenser 11 are rotatably driven by the motor 12 through a train of gears including a fibre gear 23 on the motor shaft 24, an intermediate spur gear 26 and pinion gear 27 secured thereto, and a segmental gear on the back plate 28 of the control assembly on the rotary shaft 22. The spur gear 26 and pinion gear 27 are each rigidly secured to a shaft 29 rotatably supported in a pair of frame plates 31 mounted onto the end motor frame plate at each end of the motor. A solenoid 32 for the muting relay, as will be described, is mounted on a supplementary bracket 33 which likewise is secured onto one end of the motor frame.

All of the above described structure is preassembled as a complete unit and with it all open and readily available, as shown in Figs. 1, 2 and 9, particularly, it is completely checked and tested before it is assembled into the radio receiver for which it is adapted.

As to the rotary control assembly, this includes a die-cast one-piece member including a hub portion 34 rigidly secured to the shaft 22 by set screws or the like, and the integral combination back plate and segmental gear 28. Integral with the back plate 28 are three bosses 36 equally angularly spaced around the back plate as shown in Fig. 4, each having a center cavity 37 therein. The bosses 36 are connected with the hub 34 by integral ribs 38 therebetween. The outside of each boss 36 is curved slightly to correspond to a circle drawn from the center of the shaft 22 as a center and passing through the outside surface of each boss, and supported upon the three bosses 36 are a plurality of identical control rings 39 (Figs. 3 and 5) corresponding approximately in inside diameter to the diameter of the circle just described. Intermediate each two control rings 39 and on the outside of the control assembly at each end thereof are identical separators or friction discs 41 (Figs. 3 and 4). Each disc 41 is provided with a plurality of inner-webs 42, and the discs are secured to the die-cast member against angular movement with relation thereto by means of a screw 43 extending through a corresponding aperture in each web 42, and corresponding washers 44 (Fig. 3) therebetween. Each screw is threadably secured in a corresponding threaded aperture 46 in the back plate 28 of the die-cast member. The washers 44 correspond in thickness substantially to the width of the control rings 39, and space the discs 41 apart a corresponding distance. The discs, or separators, are provided in a thin flexible fibre composition material. As can be seen from Fig. 4, the ringlike outer portion of each separator is spaced slightly from the three bosses 36 and flexes axially slightly at the outer circumference due to the radial distance between the fastening screws 43 and the circumference of the disc. Although these discs positively separate the control rings 39 they do permit a slight axial movement of the rings so as to permit the control ring assembly to open up enough to permit an angular adjustment of each control ring with reference to the bosses 36, and hence the rotary shaft 22 to which the die-cast member is rigidly secured. As previously described, the separators are all fixed with reference to the die-cast member and prevent the angular movement of control rings adjacent a ring being angularly adjusted. Due to the thinness of the separators the entire control ring assembly is very narrow as can be seen in Figs. 1 and 3 particularly to in turn assist in making the entire unit relatively narrow, and very compact.

In the operation of the control apparatus, and after the control rings 39 are each set to a predetermined angular position with reference to the shaft 22, as will be explained, the rings 39 and the friction discs 41 are compressed axially as an assembly and frictionally retained against movement relative to the die-cast member and hence the shaft 22. The necessary frictional pressure is obtained by a friction unit which includes a plurality of one-piece levers 48 secured adjacent one end to the control assembly by means of screws 49 threadably secured in the apertures 37 of the bosses 36. A shim 51 of spring steel is employed intermediate the head of the screw 49 and the body of the lever 48 to provide some spring pressure upon the ring assembly to prevent the rings slipping out of adjustment during the operation of setting them for the desired tuning frequencies. The friction unit also includes an apertured cap-like member 52 having a plurality of radial arms 53 on the outside thereof bent at right angles to the body of the member for engaging in corresponding notches 54 extending axially on the outside of the hub 34. The aperture 56 in the member 52 is provided at an embossed portion thereof, and has an angular collar thereon. The collar is threaded to receive a screw 57, while the inner end of each of the levers 48 is notched slightly to conform to the circumference of the collar. The same end of each lever is beveled to fit with the adjacent levers as shown in Fig. 2 and form a broken aperture at their inner end conforming in shape and size to the circumference of such collar. The screw 57 threaded in the member 52 engages a hardened steel disc 34' pressed into a recess in hub 34, at the end of the rotary shaft 22. Rotating the screw 57 in a clockwise direction for a right hand thread causes the member 52 to move axially to the left as viewed in Fig. 3 relative to the screw 57, and as it moves it carries therewith the inner end of each of the levers 48. With the levers 48 retained at the screws 49, their outer ends compress the rings 39 and discs 41 against the back plate 28 until the desired frictional pressure on the rings is obtained.

Each control ring 39 is preferably die-cast in metal, but inasmuch as its function is purely mechanical and not electrical it can be provided in any material desired. The ring includes a high side H and a low side L each extending over slightly less than 180° of the outer surface of the ring, and separated at contiguous ends thereof by a recess R (Fig. 5). A stop shoulder 40 is provided on one side of the recess R at the high side H of the ring. Cooperating with each ring 39 is a corresponding latch 19 pivotally mounted on a fixed shaft 17 as previously described. In the present embodiment of my invention, six latches are employed, as shown in Fig. 9. In order to provide as compact an assembly as possible, and provide adequate mounting and operating space for the latch magnets as will be described, and yet maintain the tips of the latch arms 59 all in alignment, the six latches are pivoted on the same shaft 17, but the magnet arm 61 of each latch varies in length, and symmetrical latches are provided in pairs. For convenience the pair of latches having the shortest magnet arm 61 are indicated by the reference character 19 (Fig. 9), those latches having the next longest magnet arm are identified by the reference character 19', and the third pair of latches are numbered 19". Armature portions 62, 62' and 62" on the latches 19, 19' and 19" respectively, extend at right angles and outwardly therefrom a varying distance, and the actuating magnets 63, with one for each latch, can be mounted in two straight lines on the frame extension 16, as shown in Figs. 1 and 2, and still be directly in the path of movement of the armatures. The core 64 for each magnet is rigidly secured in a corresponding aperture in the frame extension 16 by soldering the core to a plate 16' as shown at 16". This arrangement permits accurate positioning of the magnets, latches, and rings relative to one another in an optimum operative relationship. The winding for each magnet is grounded to the frame for the control unit as is shown in Fig. 10 by securing one end of such winding to the core. The latches 19 to 19" are pivotally secured on the stationary shaft 17 against axial movement relative thereto by a collar 66 secured to the outer end of the shaft, and a washer 67 abutting a corresponding shoulder on the shaft to define the inner limits of the latch assembly. A washer identical with washer 67 is included intermediate each two latches to space them apart for easy pivotal movement, and to correspond with the spacing of the control rings 39 in the control assembly 21.

For purposes of illustration a latch 19 is shown in Figs. 2, 5, 6, and 7, with its associated control ring 39 and magnet 63. The latch is shown in its three possible operating positions with three corresponding positions of the ring 39, and the switch mechanism 13 is shown in three corresponding positions to which it is operated by the latch 19. This mechanism is shown in idle position in Fig. 2. This mechanism includes a metal stop plate 69 mounted at one end upon fibre laminations 71 which are part of a similar insulating stack for the entire switch mechanism through which it is secured to the extension 14 by screws 72. The other end of the stop plate is adjustable relative to an ear 73 on the latch 19 by means of an adjusting screw 74 secured in extension 14. The ear 73 of the latch 19 and the corresponding ears of the other latches rest against this stop plate 69 when in idle position. They are urged to this position by spring arms 76 secured to the frame extension 16 which bear against a corresponding radial ear 77 on the latch 19, and similar ears on each of the other latches. The ears 73 of the latches operate for electric switching purposes against an insulated switch arm 78 secured to a metal switch leaf 79 which in turn is supported in the lamination stack 71. The leaf 79 has a pair of contact points 81 extending to each side of the switch arm 78 for engagement either with a corresponding contact point on the metal switch leaf 82 or a switch leaf 83. The leaves 82 and 83 are likewise secured in the lamination stack and insulated from each other and from the metal portion of the switch mechanism thereby. The switch leaf 83 bears against an insulating plate 84 as shown in Figs. 2 and 8, particularly, with the latter being flexible enough to be movable toward and away from the switch arm 78.

Gap adjustments for the various flexible elements of the switch mechanism as described are made by screws 86 and 87, each threadably secured in the frame extension 14 and bearing against or operatively connected with switch leaves 83 and 82 respectively. The adjusting screw 87 is insulated from the switch leaf 82 by a fibre button 88 secured to the switch leaf 82, while screw 86 is insulated from the leaf 83 by the insulating plate 84. The screws 86 and 87 are insulated from the switch element through which they must pass in order to reach their corresponding elements 83 and 82 respectively by being positioned in enlarged apertures in the metal stop plate 69 and the metal leaf 79 on the switch arm 78 as shown clearly in Fig. 8. A wire spring 89 is woven around the adjusting screws to hold them in adjustment.

During the tuning operation, the voice coil in the radio receiver is shorted out so that undesirable noises which would normally be reproduced in the speaker for the receiver are muted. This muting is accomplished by a relay which is grouped with the switch mechanism and includes the magnet 32 and an armature 91 flexibly mounted in the stack of laminations as shown in Fig. 2. An insulating plate 92 is likewise mounted in the lamination stack for adjusting the position of armature 91.

The position of the insulating plate 92 and armature 91 is adjusted by a screw 93 threadably secured in the frame extension 14 and extending through corresponding apertures in the stop plate 69 and switch arm 79 so as to be out of contact therewith as shown in Fig. 8. The position of the plate 92 determines the idle position of the armature 91 and consequently the armature gap at the magnet. When the driving motor is energized the magnet 32 is energized to attract the armature 91 and close the muting circuit as will be subsequently explained.

The operation of my electric tuner will be more clear from a consideration of the circuit diagram of Fig. 10. A series of push-buttons are provided with each one indicated by the reference character 95, and these may be appropriately mounted on the radio receiver itself or on a remote unit connected with the receiver by an electric cable. After the receiver is turned on by closing the switch 96 in the current supply line for the tuner and the radio receiver, a selected button 95 may be pressed to engage a pair of switch contacts 97 and 98. Engaging these contacts closes a circuit from the current supply 99, which in this case is a battery because the circuit is illustrated for an auto radio receiver, through the switch 96 (which has been moved to closed position from the position illustrated in Fig. 10), through a lead 101 and 102, to a conductor 103 connected to the switch contact 97 and to pilot lamp 105. The conductor 103 is common to all of the switch contacts corresponding to contact 97 on each of the buttons 95. Switch contact 97 and conductor 103 may be electrically connected to a corresponding latch magnet 63, which is connected to ground at one side, through conductor or leads 104 via the switch contacts 98. Closing this circuit energizes the magnet 63 which attracts the corresponding pivoted latch 19 thereto, and the angular movement of the latch under the attraction of the magnet 63 depends upon the angular position of a corresponding control ring 39 at that particular time. As illustrated in Fig. 10, the latch 19 stops on the high side H of the ring 39. It is then in a position corresponding to that shown in Fig. 5 with the switch arm 78 in turn remaining in contact with the switch leaf 82. The switch arm 78 and contact 82 are in engagement even at idle position, as shown in Fig. 2. The gap at idle position between the tip of the latch arm 59, and the high side H of the ring 39, and the gap between the switching ear 73 of the latch and the switch arm 78 is such that when the latch 19 is pivoted slightly to the high side H of the ring 39, the arm 78 and contact 82 remain in engagement. This switch adjustment is accomplished by means of the screw 74 against the stop plate 69 and the screw 87 against the switch leaf 82.

A third switch contact 106 is provided for the push-button 95, and although this is insulated from the contacts 97 and 98, it is spaced only slightly therefrom and the normal operation of the push button 95 moves the same inwardly so that it engages not only with the contacts 97 and 98 but also the contacts 106. When this occurs a circuit is completed through the field F of the motor 12, extending through the conductor 107, conductor 108, switch arm 78, switch contact 82, and through the motor field F and armature A to ground. The conductor 107 is electrically common to all of the switch contacts 106 for the push buttons 95. Energizing the motor field F causes the motor to rotate, to in turn rotate the control assembly through the gear 28, and the shaft 22 having the condenser 11 thereon. The direction of rotation of the motor will be hereinafter described.

In order to prevent any undesirable noises at the loud speaker 109 during the rotation of the condenser through various signal frequencies as it moves to the particular predetermined frequency desired, the voice coil 111 of the speaker is shorted out by drawing the switch arm 91 of the muting switch to the magnet 32, energized when the motor current is energized, which completes a circuit through the switch arm and grounded magnet core, and the voice coil to ground.

The push button 95 is held in closed position by the operator until the tuning operation is completed. This is so rapid that the button is held only momentarily even while the condenser 11 and the control assembly 21 are moving the limit of their angular movement or approximately 180°. In fact, in one commercial embodiment of the invention the maximum angular movement of the tuning mechanism can be accomplished in approximately one second. In the position of the illustration of Fig. 10, the control ring 39 is driven in a counter-clockwise direction by the motor 12 when the latch 19 is pivoted to the high side H. With control rings of such relatively great diameter as shown in Fig. 2, and yet the maximum tuning movement being accomplished in approximately one second (in one embodiment), the great speed of movement of a control ring past the selected latch can be understood. Normally the ring driven in a counter-clockwise direction passes the latch tip 59' at the recess R, permitting the latch to be pivoted until the tip strikes the low side L, which in turn opens contacts 78—82 and closes contacts 78—83 of the switch 13 to reverse the motor and drive the ring 39 in a clockwise direction. The tip 59' engages the high side of the recess R when the ring is moving in this direction. With the magnet arm 61 of the latch 19 spaced away from the core of the magnet 63, as shown in Fig. 5, the arm is pivoted an additional amount when the tip of the latch arm 59 reaches the recess R, to the stop position as shown in Fig. 7. As can be seen from this description the rotor mechanism is always stopped when going in the same direction, thus minimizing any possible inaccuracies in stopping position due to lost motion in the mechanism, and assuring the maximum precision in tuning. The magnet 63 and the motor 12 remain energized so long as the button 95 is held in operating position. The tip 59' of the latch arm 59 mechanically and positively seats in the recess R due to the shape of the tip and the recess, and holds the control assembly 21 and condenser 11 against rotation. The outer or right hand surface of the tip 59' as viewed in Fig. 7 is preferably accurately formed upon the circumference of a circle with a radius equal to the distance from the center of axis 17 to such surface.

A slip clutch, as shown in detail in Fig. 9a, between the driving gear 23 and the motor shaft 24 permits the latter to rotate while the gear 23 and its connecting train are stopped, thus cushioning the blow which occurs when the latch tip 59 engages with the shoulder 40 for the recess R (Fig. 7), to stop and position the mechanism at the desired frequency. This clutch comprises a spring washer 110, and a flat washer 110' supported on the shaft 24, with the spring washer 110 urging the gear 23 against the collar 23' on the end of the shaft. The washer 110' in turn bears against a shoulder on the shaft 24. When the button 95 is released by the operator it is suitably pressed by a spring out of engagement with the contacts 97, 98 and 106, to open the motor circuit first and then the various magnet circuits. The spring finger 76 acting on the radial ear 77 of the latch 19 returns such latch to idle position as shown in Fig. 2. This return motion of the latch is aided by the spring tension of the switch leaves, 78 and 83.

The operating circuit for the control unit when the latch 19 is drawn into the low side L of the control ring 39 (Fig. 6) is substantially identical with that just described except that the switch arm 78 is moved into engagement with the switch contact 83. This closes the motor circuit through the field F in a reverse direction, causing the motor to rotate the control assembly in a clockwise direction until the tip of the latch arm 59 engages in the recess R as shown in Fig. 7, and as described above.

Before the control unit is operated for tuning purposes as described above, all of the control rings 39, or at least a number corresponding to the number of stations it is desired to tune, are set in predetermined angular positions corresponding to the tuning positions of the condenser 11 for each of the desired stations. Assuming that the screw 57 and its associated mechanism, including the levers 48, are in a non-friction position, a selected button 95 is pushed in to complete the switch connections through the contacts 97, 98 and 106, to in turn energize a corresponding magnet 63 and the motor 12. This causes the corresponding control ring 39 which is still held under a slight friction by spring 51 to rotate until the tip of the latch arm 59 drops into the recess R of the ring. The operator either releases the button 95 entirely and then pushes it in only enough to engage the contacts 97 and 98, or originally lets the button move out of engagement with contact 106, thus maintaining the magnet 63 circuit and breaking the motor circuit. With the latch arm 59 in the recess R, the gear 28 and the die-cast member, including the hub 34 integral therewith, are rotated manually by the operator by an ordinary manual tuning knob at the radio receiver, or at a remote control unit. The knob may be operatively connected by a flexible cable or the like with a molded coupling 113 (Fig. 9) secured to the shaft 29 to which the gears 26 and 27 are likewise secured.

The condenser 11 is then rotated relative to the held ring 39 until it is in an angular position corresponding to the signal frequency desired. This position can be ascertained by the usual dial scale for the radio receiver, which is not shown here, and by listening, or using an output meter. When this position of the condenser 11 is obtained the button 95 is released to open the magnet energizing circuit. This same procedure can be followed for each of the control rings 39, and with each ring separated from each other ring in the control assembly 21 by the axially yieldable but angularly fixed discs or separators 41, there is no possibility of the relative movement between a control ring 39 and the shaft 22 causing any displacement of the control rings previously set.

The limits of movement of the rotors for the condenser 11 are of course determined in the condenser itself. Assisting in this limiting movement, however, is a rigid stop 114 on a plate 115 secured to the adjacent end of the frame for the condenser 11 which in turn is secured to the main frame 10 of the control unit. Shoulders 117 on the segmental gear 28 spaced approximately 180° apart engage the stop 114 at each limit of the condenser.

When the setting operation for the rings 39 is completed, the screw 57 is rotated so as to move the cap member 52 threadably thereon in a direction axially of the shaft 22 and to the left as viewed in Fig. 3, and pivot all of the levers 48 to compress the rings and separator discs of the control assembly against the back plate 28 of the die-cast supporting member. Although a screw with an ordinary slotted head is illustrated in the various figures, to be turned by an ordinary screw driver, I may employ a suitable knob which can be turned by hand, such as that illustrated in Fig. 11.

The tuning unit shown in Figs. 18–26, is substantially similar to that illustrated in Figs. 1–10, except for the switch mechanism 13' and associated magnet structure 301 which are adapted for operation with alternating current. Similar numerals of reference, therefore, shall be used to designate similar parts. Figs. 1 to 17, inclusive, are taken directly from my application Serial No. 277,856, filed June 7, 1939. Since the tuner structure of Figs. 18 to 26 is similar in many respects to that of Figs. 1 to 10, it will now be described. It will be noted, therefore, that the reference numerals relating to Figs. 18 to 26 do not chronologically follow those of Figs. 1 to 10.

With reference to Fig. 18, the ring assembly 21 is similar in all respects to that described in connection with Fig. 2 and further explanation thereof is, therefore, believed to be unnecessary. Latches such as 19a and 19b are provided for the corresponding rings 39, the operation of each latch and its assembly relative to the switch mechanism 13' and corresponding control ring 39 being the same as that of the latches 19 hereinabove described in connection with Fig. 2. Only two latches 19a and 19b are indicated, but it is to be understood that a greater number may be used, the number of stations desired to be tuned in by the tuner structure being determining in the number of latches used. As previously noted, the tuner of Fig. 2 is adapted for direct current operation, the armature portions 62, 62' and 62'' being firmly connected to their corresponding latches 19, 19' and 19''. For alternating current operation, however, the armature portions such as 62a and 62b in Fig. 18 are formed separately from their corresponding latch portions 19a and 19b.

The armatures 62a and 62b are arranged for actuation by alternating current magnets 63a and 63b, respectively. Although only the two magnets 63a and 63b are shown, it is to be understood that there are as many magnets as there are latches. These magnets are oppositely arranged in two parallel rows, the magnets 63a and 63b being illustrated as the first magnets in such rows. Each magnet has its pole divided into two portions, one of which portions is fitted with shading rings, as indicated at 301, in a manner well known in the art. The magnets are mounted in a yoke member 302 of substantially U-shape having leg members 303 and 304. Finger portions 306a and 306b on the latches 19a and 19b extend over the corresponding magnets 63a and 63b and are provided with extensible members 307a and 307b, respectively. Since the assembly and operation of each latch and its associated magnet structure is the same, only one latch, say 19a, will be referred to in the following description.

Connection between the extension 307a and armature 63a (Fig. 19), is made by a flat spring 308 of angulate shape having a body portion arranged substantially adjacent to and coextensive in length with armature 62a. An upwardly extending end portion 309 of the spring 308 is formed with an aperture 312, (Figs. 22 and 23) for receiving therein the extensible member 307a. A small auxiliary spring 313 is attached to the side of the extension 307a at the aperture 312 and functions to eliminate any chatter, arising by virtue of alternating current operation, which might occur between the extension 307a and the spring 308 at the opening 312. A depending spring portion 311 is in abutting engagement with a supporting member 314 in a manner to keep the spring 308 under tension for a purpose to be later explained. The portion 311 and member 314 are secured to the leg member 303 by suitable screw means 316 or the like. Spring 308 is reinforced by additional laminated spring members 317 which in combination with the spring 308, serve to provide a spring tension on the armature 62a which is highly flexible but substantially constant over the complete operating range of the armature movement. Laminations 317 are secured as by a rivet or screw 318 to the upper side of the armature 62a, a projecting end portion 321 thereof extending through the member 314 whereby to pivotally support the armature 62a for pivotal movement into and from its operating position with the magnet 63a.

For purposes of illustration the latch 19a is shown in Figs. 18 through 21, with its associated control ring 39 and magnet 63a. The latch is shown in four possible operating positions with four corresponding positions of the ring 39, and the switch mechanism 13' is shown in four corresponding positions to which it is operated by the latch 19a. The switch mechanism 13', which is common to all of the latches, is shown in its idle position in Fig. 21, includes a reversing switch for the motor 12' which is substantially similar to the motor reversing switch hereinabove fully described in connection with Fig. 2. The metal stop plate 69, switch arm 78 and switch leaves 82 and 83 are all secured in the lamination stock 71 in a manner to be entirely insulated from each other. The free end of the stop plate 69 is adjustable relative to the latch ear 73 by means of the adjusting screw 74 which is secured in a frame extension member 14'.

The ear 72 of the latch 19a and the corresponding ears of the other latches rest against the stop plate 69 when in idle position. It is urged to this position by the spring 308 in an obvious manner.

Gap adjustments for the various flexible elements of the switch mechanism 13' are made by screws 86 and 87 which are threadably secured in the frame extension 14', and are operatively connected with the switch leaves 83 and 82, respectively. (Fig. 24). The screws 86 and 87 are insulated from the switch element 69 through which they must pass in order to reach their respective switch leaves 83 and 82, by being positioned in enlarged apertures formed in the metal stop 69; the screw 86 being further extended in a like manner through an aperture in the leaf 79.

During the tuning operation the radio receiver is muted so that undesirable noises which would normally be reproduced in the speaker for the receiver are eliminated. This muting is accomplished by a relay which is grouped with the reversing switch mechanism and includes a magnet 32 and a pivotally supported armature 91' of substantially hooked shape, it being understood, of course, that the relay is also common to all of the latches in the tuner structure.

The position of the armature 91' (Fig. 24) is adjusted by a screw 93 which is threadably secured in the frame extension 14' and extends through corresponding apertures in the stop plate 69 and switch arm 79 so as to be out of contact therewith. A supporting bracket 319 for holding the armature 91' in its open position is adjustably secured to a yoke member 322 for the magnet 32. The position of the supporting member 319 and hence of the armature 91' is adjusted by the screw 93. Positioning of the plate 319 thus determines the open position of the armature 91' and consequently the armature gap at the magnet. When the driving motor 12' is energized the magnet 32 is energized to attract the armature 91' and open the muting circuit as will be subsequently explained.

The free or hook end of the armature 91' has contacts 323 and 324 on opposite sides thereof which are selectively engageable with contacts 326 and 327, respectively, the latter contacts being associated with switch leaves 328 and 329, respectively. The switch arms 328 and 329 are suitably secured in the laminated structure 71 and are spaced from each other near their free ends by a spacing element 331, which will be later explained.

The operation of the tuner structure of Fig. 18 is best understood from a consideration of the circuit diagram of Fig. 25. Alternating current is supplied to the circuit from a source 332 such as the usual 110 volt house current. In the event the tuner assembly is to be used in conjunction with a clock mechanism, a clock 333 may be arranged across the supply lines 334 and 336, as indicated, the master switch 337 being connected so as to shut off the energy supplied by 332 from everything but the clock. With a supply voltage of 110 volts, the power transformer 338 of the radio receiving set, in one commercial embodiment, is provided with a secondary winding 339 which is wound for about 25 volts. The secondary winding 341 is wound for about 6 volts and serves to energize the heaters of the radio tubes and the tuning motor 12. A usual high voltage secondary winding 342 supplies current to the rectifier and tube 343 which energizes the B-supply circuit of the radio set.

A plurality of push button switches 344, one for each of the tuning magnets may be arranged at the radio receiver or remotely therefrom, the magnets being connected in parallel across leads 340 and 345. In series in the common return lead 345 of the tuning magnets 63a–63f, is the winding of the relay switch magnet 32. A winding 346 for the closing coil of a power relay which may be similar to that shown at 215 in Fig. 17, is also connected in series in the common return 345. The opening coil for the power relay is indicated at 347. The power relay operates the switch 348 in the heater circuit and the switch 349 in the B circuit. Since the closing coil 346 of the relay is in the common return lead of all of the magnets 63a–63f, the power relay is closed whenever any magnet is energized. The opening coil 347 is in a circuit by itself and the relay is therefore opened only when the button marked "Off" is closed; the circuit including lead 349, conductor 351, lead 345 and secondary coil 339. When the button marked "On" is closed, the circuit comprised of lead 340, conductor 352, and lead 345 including only coil 346 and winding 339 is closed, a tuning magnet being energized only when a push button 344 is operated. A volume control motor 353 and suitable buttons 354 and 354' for raising and lowering the volume may be provided if desired, the motor being suitably connected across the leads 340 and 345.

Let it be assumed that the tuning unit is in its idle position as indicated in Fig. 25 and more in detail in Fig. 21, the latch 19a being near the high side H of the ring 39. Contacts 324 and 327 of the relay switch are in contacting engagement so that the muting circuit shown at 357 is closed and the radio set is ready for playing; the switch arm 78 being in contact with the switch leave 82 to complete the motor energizing circuit through the field 356 for one direction of rotation. Actuation of the push button 344 to energize the magnet 63a simultaneously energizes the relay magnet 32 and the closing coil 346 for the switches 348 and 349. Energization of the magnet 32 attracts the armature 91' to its closed position. This movement of the armature opens the contacts 324 and 327 to open the muting circuit and also closes the contacts 324 and 326 to close the motor 12' through field 356. The flow of current through the motor field coil 356 effects a rotation of the ring 39 in a counter-clockwise direction as viewed in Figs. 18 to 21, inclusive. This arrangement of the switch mechanism 13', on energization of the magnets 32 and 63a, is illustrated in Fig. 20. It is to be noted that although the magnet 63a is energized the armature 62a is not pulled against the pole of the magnet 63a. Spring 308 and laminations 317 are made with sufficient initial tension to operate the switch 13', as will be later explained, which tension prevents the armature 62a from closing against the magnet pole when the latch 19a is on the high side H of the ring 39. There would be no objection in making the magnet strong enough to pull the armature into engagement therewith, but this would require a larger magnet, and hence additional cost without accomplishing any useful object.

On rotation of the control ring 39a in a counter-clockwise direction the latch 19a engages the low portion L of the control ring. This movement of the ring permits a pivotal movement of the latch 19a about its axis 17 in a counter-clockwise direction whereby the ear 73 is moved upwardly as shown in Fig. 19. Since the ear 73 is normally engageable with the switch arm 78, contact between the switch arm 78 and 82 is broken and switch arms 78 and 83 are closed to complete the circuit of the motor 12' through the field 356' (Fig. 25). This change in the motor circuit effects a reversal in the direction of rotation of the motor, the radio set continuing to be muted by virtue of the closed contacts 323 and 326. With the latch arm 19a in engagement with the low side L of the ring 39, the armature 62a is pulled into engagement with the magnet 63a. This is accomplished by arranging the strength of the spring 308 and the laminations 317 so that the magnet 63a is not strong enough to pull the armature to its closed position when the latch is in engagement with the high portion of the control ring as previously mentioned in connection with Fig. 20. The spring strength, however, is such that the magnet is strong enough to pull the armature down when the latch 19a engages the low side L of the ring as is shown in Fig. 19. It is to be understood, of course, that the magnet 63a may be of a size to draw the armature 62a to its closed position whenever it is energized, but this would require a larger magnet and the larger magnet is not necessary since the above described structure provides sufficient force for efficiently operating the switch mechanism 13'. On reversal of the motor 12' by virtue of the movement of the switch arm 78 by the latch ear 73, the rotation of the ring 39 is correspondingly reversed so that the latch tip 59a is positively moved into the notch R in a manner similar to that previously fully explained in connection with the operation of the tuning structure of Fig. 2. The function of pulling the latch 19a into notch R is accomplished by the action of the spring 308 and laminations 317. In this connection it is to be observed that a clearance gap indicated at 358 in Figs. 18–20, is maintained between the armature 62a and the spring 308 when a latch 19a is either on the low side L or in the gap R of a ring 39. It is desirable that this small gap be maintained in order to keep a spring pressure applied on the latch to maintain a frictional engagement between the control ring 39 and the latch when the latter is in the notch R.

On movement of the latch 19a to its operated position as indicated in Fig. 18, the latch ear 73 is permitted to move additionally in an upward direction to further raise the extension 78 on the leaf 79. This additional upward movement of the extension 78 moves the leaf 83 of the reversing switch into engagement with the insulating spacing member 331 previously noted, to lift the spacing member. Since the spacing member 331 operatively connects the contacts 326 and 327, these contacts are moved relative to the armature 91 so that contacts 323 and 326 are opened and contacts 324 and 327 are closed. Opening of the contacts 323 and 326 opens the circuit of the motor 12' and the closing of the contacts 324 and 327 closes the muting circuit of the radio set so that the set is ready for playing substantially concurrently with a stopping of the tuning motor. It is understood of course that the push button is held closed during the entire tuning operation. Release of the push button 344 deenergizes the magnets 63a and 32 and the switch mechanism is returned to its idle position shown in Fig. 21. The contacts 324 and 327 continue to remain closed as the mechanism returns to its idle position, by virtue of the relative pivotal movements of the armature 91, switch leaf 83 and latch ear 73. Since the spacer 331 is in engagement with the switch leaf 83 the relative positions of the contacts 323, 324, 326 and 327 are thus maintained during the movement of the latch 19a from its operated position of Fig. 18 to its idle position indicated in Fig. 21. The set, therefore, is retained in a playing condition and the motor reversing switch is set to permit the current flow in the motor circuit to pass through the field 356 on later actuation of a push button 344. The rotor mechanism 21 is thus always stopped when going in the same direction whereby to minimize any possible inaccuracies in its stopping position due to lost motion in the mechanism.

A slip clutch, as shown in detail in Fig. 9a, may be provided between the driving gear 23 and the motor shaft 24 to permit the latter to rotate while the gear 23 and its connecting train are stopped, thus cushioning the blow which occurs when the latch tip 59a engages with the shoulder 40 for the recess R (Fig. 18), to stop and position the mechanism at the desired frequency.

The predetermined angular positioning of the control rings 39 to correspond to the tuning position of the condenser 11 for each of the desired stations is similar in all respects to that fully described above in connection with Fig. 2.

From the above description of the tuner in Fig. 18 it will be evident that the switching mechanism 13' may be applied to the direct current tuner shown in Fig. 2 by simply substituting such mechanism for the corresponding mechanism 13 shown in Fig. 2. As illustrated in Fig. 26 the circuit for this arrangement includes a relay switch operating magnet 32, an armature 91' and contacts 323, 324, 326 and 327 all as above described. The reversing switch, including switch arm 79 and switch leaves 82 and 83 is also the same as previously explained. In the idle position of the tuner the switch mechanism 13' is arranged as shown in Fig. 26, namely with contacts 324 and 327 closed, contacts 323 and 326 open, and switch leaves 79 and 82 closed. The closed contacts 324 and 327 close the speaker circuit which includes secondary winding 360, voice coil 111, conductor 359, contacts 324 and 327 and grounded conductor 361, the opened contacts 323 and 326 serving to open the circuit of the motor 12. On closing of a push button 344a for the magnet 63, the magnet 32 is energized, the circuit from the battery 99 including conductors 362, relay magnet 32, conductor 363, push button 344a and magnet 63, the circuit being completed through the ground connection 364. Energization of the relay operating magnet 32 attracts the armature 91' to close the contacts 323 and 326 whereby to energize the motor 12, the motor circuit from the battery 99 including conductors 362 and 366, switch leaves 79 and 82, motor field F, conductor 367, contacts 323 and 326 and grounded conductor 361. Closing of the contacts 323 and 326 occurs simultaneously with the opening of the contacts 324 and 327 so that the motor 12 is operated simultaneously with a muting of the radio receiver. The direction of rotation of the motor 12 is determined by the direction of current flow in the field F as controlled by the motor reversing switch in the manner above fully explained. In view of the above detailed description of the operation of the tuner of Fig. 18, a further explanation of the circuit diagram in Fig. 26 and its operation is believed to be unnecessary.

A modification of my invention is illustrated in Figs. 11 to 17, inclusive. The modification is provided in a preassembled unit including a main frame member FR with side walls W on all four sides of the body portion of the frame member. A variable condenser C is mounted on one side of the frame member and the rotary shaft therefor extends through the frame to carry a rotary control assembly 118 thereon on the other side of the frame member. A motor 119 is rigidly secured to the frame and is connected to the rotary shaft 121 for the condenser C and control assembly 118 by means of a train of gears including a pinion gear 122 secured to the motor shaft 123, and a segmental gear 124 fixedly secured to the control assembly 118, as will be described. Intermediate these gears is a gear 126 on a stub shaft 127 which carries the corresponding pinion gear 128 in meshing engagement with the segmental gear 124. Intermediate the gear 126 and its shaft 127 is slip clutch mechanism comprising hub 120 and spring washer 125 which permits the motor to rotate when the control assembly is held. Hub 120 is secured to shaft 127 by a set screw, and gear 126, which is free to rotate relative to the shaft, is pressed against the hub 120 by spring washer 125, thus giving a friction drive between hub 120 and gear 126. Likewise supported upon the frame member FR is a supplementary frame portion including a plate 129, a bracket 131 and another plate 132, all cooperating to support the pivoted latches, the magnets, and the switch mechanism operating therewith.

The control assembly 118 includes a die-cast one-piece support having a back portion 133 and a plurality of ribs 134 extending axially therefrom to a hub portion 136 in the center of the die-cast member. The hub portion includes a cavity at one side for fitting over the shaft 121 as shown in Fig. 13, and a cavity at the other side for receiving friction adjusting mechanism as will be described. The outer edges of the ribs 134 support a plurality of control rings 39' thereon which are substantially identical with the control ring 39. These include a high side H', a low side L', and a stop recess R', as is clear in Fig. 14. Separating each two adjacent control rings 39' is a thin metal ring 138 which is likewise supported on the outer edge of the ribs 134. The rings 39' are angularly adjustable on the die-cast member as explained for the first embodiment of my invention, and the separator rings 138 are retained against angular movement by means of a pin 139 rigidly secured in the back plate 133 of the die-cast member and extending through apertures 140 (Fig. 11) in ears 140' integral with the rings 138. The pin 139 likewise extends through the gear 124 secured to the back portion 133 and serves as a guide pin for the two halves of the gear 124 as shown in Fig. 13. This gear is provided in two axially aligned identical portions which are spread angularly to take up back lash between the gear and driving pinion gear 128 in the well-known manner.

The control rings, when in set angular position, are held in such position by friction applying mechanism operating generally in the manner described with reference to the structure in the first embodiment of my invention. The friction mechanism includes a screw 141 extending into the cavity in the hub portion 136 comprising a restricted portion 142 and an enlarged portion 143. The inner end of the screw 141 rests against a ball bearing in the restricted portion 142 and an intermediate portion of the screw is threaded for threaded connection with a nut 144. The nut is hexagonally shaped, or in fact may be utilized in any shape other than round, and the side walls of the cavity 143 are similarly shaped so that the nut will not rotate in the cavity. It may however move axially therein. Levers 48' rest at one end against the circumference of the outer rings 39' and at the other end upon the outside face of the nut 144. The end resting upon the nut 144 is notched and beveled to surround the screw 141 as explained for the lever 48. Each lever is retained on the control assembly by a screw 49' extending into a corresponding threaded cavity in each rib portion 134 of the die-cast member. Upon rotating the knob 146 in a clockwise direction for a right-hand thread, for instance, the nut 144 thereon moves axially but non-rotatably to in turn move the inner end of each lever 48' to the left, as viewed in Fig. 13, to apply friction to the control assembly as has been described. In removing friction the knob 146 is rotated in the opposite direction.

Figure 12:
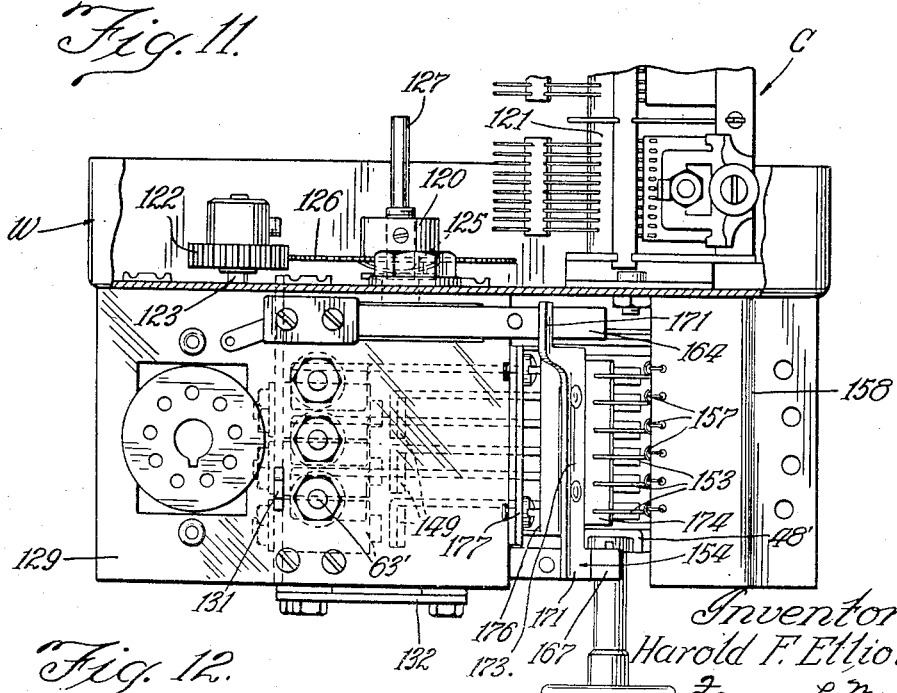
Fig. 12 is a top plan view of the complete preassembled unit of Fig. 11.

The pivoted latches, indicated generally by the reference character 147, include a latch arm 148 and a magnet arm 149, all integral with one another. To condense the operating magnet assembly as much as possible alternate latches 147 have slightly different configurations for their magnet arms so that the magnet arm 149 for the first latch 147, for instance, is substantially at right angles to the latch arm 148, while the magnet arm 149' (dotted lines, Fig. 11) for the second latch 147 is substantially parallel with the latch arm 148 therefor. The latch arms 148 for all of the latches are in alignment as shown in Fig. 11. All of the latches are pivotally supported upon a stationary shaft 151, and are selectively pivoted into operating engagement with the control rings 39' by solenoids or magnets 63' mounted on the supplementary frame plate 129 and the bracket 131 as shown in Figs. 11 and 12. A trigger 152 is pivotally supported on the end of each latch arm 148. The trigger comprises a plurality of radial portions which include a latch ear 153, for latching engagement with a switch gate 154, as will be described, and a stop ear 156 having a projection thereon for engaging the back edge of the latch arm 148. This engagement limits the pivotal movement of the trigger under the tension of the spring 157 connected intermediate a frame bracket 158 and a radial ear 159 of the trigger. A nose 161 comprises the remaining radial portion and this is of such a shape and size as to be complementary to the stopping tip of the latch arm 148 and increase the effective width of such tip.

The switching mechanism for the tuning unit includes a motor main line switch 162 and a reversing switch 163. These switches are mounted upon opposite sides of the frame plate 129 as shown in Figs. 11 and 12, with the switch 162 comprising a pair of contact members 164 and 165, and the switch 163 comprising a switch arm 167 with oppositely disposed yieldable contact members 168 and 169. Both switches are operated by the pivoted gate unit 154 which comprises a stamped-out plate having a body portion extending intermediate the two switch assemblies as shown in Fig. 12. A transverse portion 172 carries a switch operating arm 173 with integral side extensions 171 made of insulating material, and a flange 174 over which the trigger ear 153 latches as shown in Figs. 11, 14, and 15. An aperture 176 in the body portion of the gate is positioned so that an insulated stop plate 177 supported on the frame plate 129 may extend through the gate and rest in the back of all of the latches 147, determining the limit of angular movement of the latches in a counter-clockwise direction under the influence of the springs 157. The stop plate 177 is provided with shoulders 178 to define the back limit of pivoted counter-clockwise direction by the switch gate 154 and hence the upward limit of contact 164 in the switch 162, and switch arm 167 in the switch 163.

As is illustrated in Fig. 11, in the idle position for the entire tuner mechanism the latches 147 are pulled upwardly, as viewed in Fig. 11, by the springs 157. By virtue of the beveled configuration of the nose of the trigger arm 153 which engages the flange 174, the trigger 152 is pivoted to snap into latching engagement with such flange on the gate. In the meantime the switch contact 164 and the switch arm 167 are holding the gate in retracted position, so that the switch operating mechanism is all latched together in an idle position, as will be described more fully hereinafter.

A commercial adaptation of this modification of my invention is illustrated schematically in Fig. 17 showing a time control clock described in my copending application, Serial No. 239,696, filed November 9, 1938, including an arm 181 which is driven directly by a clock motor CM so as to complete an entire cycle of operation in twenty-four hours. A cam switch 182 is provided on the clock mechanism, and this is designed to close every fifteen minutes in a twenty-four hour period. A plurality of conductors 183 are likewise provided on the clock mechanism and spaced so that the arm 181 engages a conductor 183 once every fifteen minutes, thus extending a circuit from the particular conductor 183 through the movable contacts in the switch indicated generally by the reference character 182. The conductors 183, in turn, are adapted to be interconnected with electric tuner leads by slidable contacts 184. A tuner lead as 186, in turn, is electrically connected with a corresponding latch magnet 63' on the tuner mechanism of the present invention. The circuit from the cam switch 182 extends through leads or conductors 187, 193, and 201, to the negative terminal of a rectifier 202 which serves to energize all control circuits. The conductor 187 is likewise common to a plurality of push-buttons 189 which may be operated from a panel on the front of the radio receiver or from a unit remote from the radio receiver. An energizing circuit, as will be described, can be closed at fifteen minute intervals throughout a twenty-four hour period by means of the arm 181 and cam switch 182 as was described.

Simply from the standpoint of simplification of description, however, the operating circuit for the tuner will be described as originating through the closing of a push-button 189 which of course is in parallel connection to each other operating circuit through the clock mechanism. In the first place, the main line switch M, connected directly into the current supply line for the entire radio receiver system, is closed. With this closed, the power transformer 191 is energized and current is available for operating a radio receiver as well as the tuning mechanism. This also makes the operating circuit available for the tuner motor 119. Closing a selected push-button switch 189 extends the circuit on one side through a conductor 192 to a corresponding latch magnet 63', and then to ground. On the other side of the push button the circuit is extended through conductor 193 to the negative side of the rectifier 202. The positive side of the rectifier is connected through lead 203 to magnet 198 and thence to ground, completing the circuit. Magnet 198 is thus in the common ground return circuit between all solenoids 63' and the rectifier 202. Magnet 198 closes power relay 197 and energizes the heater and B supply circuits of the receiver whenever any solenoid 63' is operated.

Energizing the magnet 198 attracts the pivoted armature 204, which in turn is secured to an insulating plate 206. When the armature 204 is in engagement with the core of the magnet 198 a pivoted latching armature 207 associated with the magnet 208 is pulled toward the right, as viewed in Fig. 17, by the spring 209 and latches the plate 206 under the shoulders 211 on the armature 207. With the attraction of the armature 204 the contact unit 212 on the plate 206 is brought into electrical engagement with corresponding contacts 213 and 214 supported on an insulating plate 215 on the end of the relay frame, and a ground connection is established through the contact 216 on the plate 206 and the conductor 217 soldered or otherwise secured onto the metal frame for the power relay. The contact 216 is electrically connected with a third contact 218 on the plate 215. Contact unit 212, and its corresponding contacts 213 and 214 are in the output and filament circuits of power rectifier tube 220 completing the B supply circuit for the radio receiver when closed. Contact 216 closes the heater circuits for the receiving tubes utilizing secondary 219 on the power transformer.

Although the motor voltage is available when the power transformer 191 is energized, it is not utilized until a push-button 189 is operated or an operating circuit is closed through the clock mechanism. The motor is connected, upon such closing, into a circuit including secondary winding 194 on the power transformer which is connected on one side to ground and on the other through conductor 196 to motor switch 162. This circuit likewise provides the muting voltage via tube 222 which supplies a rectified potential for muting the receiver during a tuning operation. The conductor 224 is connected to the switch arm 167, via a coupling condenser. Switch 188 serves to close the relay 197 and turn the set on manually, and operates separately from the automatic control circuits.

In the position of the control ring 39' in Fig. 17, the latch 147 is pivoted by the energized magnet 63' until it engages the high side H' of the control ring. This closes the main motor switch 162, energizing the motor. The contacts 167 and 168 remain closed with this action, and a corresponding field in the motor 119 is energized to rotate the control assembly including the control ring 39' in a clockwise direction. This is shown in greater detail in Fig. 14. Rotating in a clockwise direction, the notch or recess R' passes beneath the combined width of the nose 161 of the trigger and the tip of the latch arm 148. This width is greater than the width of the recess R' and under the pivotal urging of the magnet 63' the latch arm 148 merely drops to the low side L'. This is the position shown in Fig. 15. In this position the circuit through the switch arm 168 is opened, and that through 169 is closed thereby reversing the motor 119 and rotating the control assembly with the ring 39' in a counter-clockwise direction. This brings the nose 161 into engagement with the high shoulder of the recess R', pivoting the trigger 152, as shown in Fig. 16, the tip of the latch arm being pulled into a firm and complete engagement with the recess R' by the magnet 63'.

When the trigger 152 pivots at the stopped position the latch ear 153 releases the gate 154 and the switch contact 164, and arm 167 return the gate to idle position opening the motor circuit through the switch 162. This immediately deenergizes the motor 119. The operating magnet 63' however, remains energized until the operator removes his finger from the push-button 189. With this operation the control assembly and hence the condenser 117 is always stopped at a predetermined tuning position while the control assembly is rotating in the same direction, namely a counter-clockwise direction for the embodiment of the invention as illustrated and described herein. This provides a positive and uniform stopping position for each of the control rings 39', and makes for greater precision and uniformity in the operation of the tuning mechanism and hence the tuning of the radio receiver. The power relay armature 204 may be opened by closing the "off" switch 228 which is connected to a conductor 229, connected in turn to the magnet or solenoid 208 of the power relay. When this magnet is energized it attracts the pivoted armature 207 releasing the plate 206 from the shoulders 211 of such armature and permitting such plate to be pivoted away from the contacts 213, 214 and 218 by the spring 231. The magnet 208 is in the circuit with the rectifier 202 by means of a conductor 232 which in turn is connected to the conductor 203 extending to the rectifier 202. The other side of the rectifier 202 is connected by conductors 201 and 193 to push button 228, completing the circuit.

Although I have illustrated and described my invention in its preferred embodiments, it is to be understood that modifications and alterations therein may be made which are within the full intended spirit and scope of my invention as defined by the appended claims.

I claim:

1. Radio tuning apparatus having frequency changing means and rotary control means operatively connected with said frequency changing means, said rotary control means including a plurality of coaxially mounted control rings each having a stop recess in the peripheral edge thereof, a plurality of pivoted latches corresponding to said rings, with each of said latches having a stop portion thereon engageable with a corresponding recess to stop said control means at a predetermined control position, means for setting each of said control rings to a predetermined control position including a corresponding latch, an armature portion operatively connected to each of said latches, an operating magnet for each of said latches arranged to attract a corresponding armature to pivotally move a corresponding latch into engagement with a corresponding control ring, means individual to each latch for moving the same out of engagement with a corresponding control ring after its rotation to a predetermined control position, motor drive means for said rotary control means, and means for selectively actuating said magnets to individually operate said latches.

2. Electrical tuning apparatus for a radio receiver having frequency changing means, rotary control means for moving said frequency changing means to predetermined tuning positions, said control means including a plurality of coaxially mounted control rings having a stop recess in the peripheral edge thereof, a plurality of pivoted latches corresponding to said control rings, with each latch having a stop portion thereon engageable with a corresponding recess, magnet means for each of said latches arranged to pivotally operate a corresponding latch into engagement with a corresponding control ring, a motor for driving said rotary control means, a circuit for said motor and magnet means, means for selectively energizing said circuit to substantially concurrently operate a selected latch and rotate said control means, with engagement of said latch stop portion in a corresponding recess stopping rotation of said control means at one of said predetermined tuning positions, means individual to each latch for moving the same out of an engaging position with the corresponding control ring on deenergization of a corresponding magnet means, and means for setting each of said control rings to a predetermined control position including a corresponding latch.

3. In an electrical tuning device for a radio receiver having frequency changing means, rotary control means operatively connected with said frequency changing means for moving said frequency changing means to a predetermined tuning position, said rotary control means including a control ring having a stop portion in the edge thereof, a pivoted latch for said control ring, magnet means operatively associated with said latch and arranged to pivotally move the latch into engagement with said ring, spring means engageable with said latch for returning it to a rest position immediately after the operation of said magnet means, a motor for driving said rotary control means, with engagement of said stop portion and latch defining said predetermined tuning position of said frequency changing means and stopping the rotation of said control means, and means including said latch for setting said control ring to a predetermined control position.

4. A preassembled electrically operated radio tuning unit including a frame having a mounting wall thereon, a variable condenser mounted on one side of said wall and rotary control means on the other side of said wall operatively connected with said variable condenser, said rotary control means including a plurality of coaxially mounted rings each having a stop recess in the edge thereof, a plurality of coaxially mounted pivoted latches corresponding in number to said rings, with each latch having a stop portion at one end and an armature portion at the other end, means for setting each of said control rings to a predetermined control position including a corresponding latch, an operating magnet for each of said latches adapted to be selectively and individually energized to pivot a corresponding latch into engagement with a corresponding control ring, means individual to each latch for moving the same to a rest position after deenergization of a corresponding operating magnet, motor drive means for said rotary control means, and a switch mechanically common to all of said latches operated upon pivotal movement of a selected latch to energize said motor and rotate said control means to a position at which the stop portion of the selected latch is in alignment with the recess in the corresponding ring, with the energized magnet attracting the armature portion thereto and acting to pivot the stop portion of the latch into stopping engagement with said recess.

5. In a radio tuner having a frame, a rotary member with a plurality of adjustable stops thereon mounted on said frame, and an electric motor for driving said rotary member, means for changing the direction of rotation of the motor and stopping said rotary member at predetermined stop positions, said means including a plurality of pivoted latches, each latch having a stop portion on one side of the pivotal axis therefor and with all of said stop portions being substantially identical in configuration, and having an armature and arm portion on the other side of the pivotal axis with some of said armature and arm portions being of one configuration and other of said armature and arm portions being of another configuration, an energizable magnet for each of said latches, with some of said magnets being mounted in one position on the tuner frame and other of said magnets being mounted in another position on the tuner frame to conform to the different configurations of the armature and arm portions of said latches.

6. In a tuning device for a radio receiver having a frequency changing means and rotary control means for moving said frequency changing means to a plurality of predetermined tuning positions, said control means including a plurality of coaxially mounted control rings having oppositely extending circumferential portions of different radial heights and a recess intermediate the same, a plurality of pivoted latches corresponding to said control rings, each of said latches having a plurality of radially extending arms, one of said arms having a stop portion thereon adapted for seating engagement in a corresponding one of said recesses to define a predetermined tuning position of said frequency changing means, magnet means operatively connected with a second arm on each of said latches and arranged to pivotally move a corresponding latch into engagement with a corresponding control ring, a reversible motor drive for rotating said control means, a reversing switch for said motor mechanically common to all of said latches and in engagement with a third arm on each thereof, engagement of said one arm with one of said circumferential portions positioning said reversing switch to effect a rotation of said motor in one direction, and its engagement with the other of said circumferential portions positioning said switch to effect a rotation of said motor in an opposite direction.

7. A radio tuning device having frequency changing means, rotary control means for moving said frequency changing means to a predetermined tuning position, said control means including a control ring having two circumferential portions of different radial heights with a recess therebetween, a pivoted latch having a stop portion thereon for seating in said recess, magnet means operatively associated with said latch and arranged to pivotally move the latch into engagement with said ring, spring means for returning said latch to its rest position, a reversible motor for driving said rotary control means, a reversing switch for said motor arranged for actuation by said latch to two operating positions, one of said positions being in correspondence with an engaged position of said latch with the circumferential portion of lesser radial height, the engagement of said stop portion in said recess defining the predetermined tuning position of said condenser and stopping the rotation of said control means, with said latch being in engagement with said portion of lesser radial height immediately prior to a stopping of said rotary control means, and a circuit for said magnet means and motor arranged to substantially simultaneously energize said magnet means and motor on a closing thereof.

8. In combination with a radio tuning device having an electric control switch thereon, a rotary member having a pair of oppositely extending circumferential control surfaces of different radial heights and a stop recess intermediate the same, means for causing the rotation of said rotary member and also stopping the same, including a pivoted latch having a plurality of substantially radially extending integral portions, with one of said portions having an armature thereon, a second of said portions including a stop tip for engagement with one circumferential control surface or the other and adapted to engage said stop recess, a third of said portions having a pivoting limiting ear, and with a fourth portion including an ear for direct engagement with the electric control switch to operate the same and vary the direction of rotation of the rotary member.

9. In radio tuning apparatus including an electric driving motor and a rotary control member driven thereby having a pair of engageable surfaces for determining the direction of rotation of said motor and an adjustable stop recess intermediate said surfaces, the combination of a pivoted latch having a stop tip at one end thereof and an armature portion at the other end with the pivotal axis intermediate said ends, a magnet adapted to be energized to attract the armature portion of the latch and pivot the stop tip into engagement with the control member, and switch means having a pair of contact portions and a closing member, with one of said contact portions in electrical connection with said magnet and positioned in said switch means so as to be engaged first on the operating movement of said closing member to energize said magnet, and the other of said contact portions in electrical connection with said motor and positioned in said switch means so as to be engaged by said closing member subsequent to its engagement with the first contact portion, with said subsequent engagement acting to energize said motor and with the first engagement being maintained while maintaining the subsequent engagement, whereby said motor drives said control member to an angular position at which the latch is pivoted by said magnet to project the stop tip into the control member recess to stop the control member.

10. An electrical tuning device for a radio receiver having a variable condenser, rotary control means operatively connected with said variable condenser, a plurality of control rings coaxially mounted on said rotary control means, each ring having oppositely extending circumferential portions of different radial heights and a recess intermediate the same, a plurality of pivoted latches corresponding to said control rings, each of said latches having a stop portion formed thereon, operating magnet means for each latch for pivotally moving a corresponding latch into engagement with a corresponding control ring, reversible motor drive means for said rotary control means, means for selectively actuating said magnet means, and a circuit for said motor including switch means mechanically common to all of said latches, said switch means being operated in response to the position of a selected latch relative to said circumferential portions, with the engagement of said latch with one of said circumferential portions on a corresponding control ring positioning said reversing switch to effect a rotation of said motor in one direction, and its engagement with the other of said circumferential portions positioning said switch to effect a rotation of said motor in an opposite direction.

11. In a radio tuning device for a radio receiver operable with alternating current and having a variable condenser, rotary control means operatively connected with said variable condenser, a plurality of control rings coaxially mounted on said rotary control means, each ring having two circumferential portions of different radial heights and a recess intermediate the same, a plurality of pivoted latches corresponding to said control rings, each latch having a stop portion formed thereon, magnet means including an armature for each latch, means for selectively actuating said magnet means to pivot a corresponding selected latch into engagement with a corresponding control ring, spring means operatively connecting each armature with a corresponding latch, said spring means being arranged to exert a tension pressure between said armature and latch on energization of a corresponding magnet, said tension pressure retaining the selected latch in engagement with a corresponding control ring regardless of the operated position of the armature corresponding to the selected magnet means, reversible motor drive means for said rotary control means, a circuit for said motor including switch means mechanically common to all of said latches and operated thereby, said switch means controlling the direction of rotation of said motor in response to the position of a selected latch relative to said two circumferential portions to provide for the rotation of said control means to an operated position at which the stop portion of the selected latch is in alignment with the recess in the corresponding ring.

12. Radio tuning apparatus including in combination a plurality of control rings with each ring having a stop portion thereon, a plurality of pivoted latches corresponding to said control rings, each latch having at least two radially extending arms, with one of said arms having a tip thereon for mechanical engagement with the stop portion of a corresponding control ring, an extensible member attached to a second of said radial arms, an operating magnet for each of said latches, an armature for each of said magnets, spring means operatively connecting an armature with a corresponding extensible member and arranged to normally hold said armature in an open position, said spring means exerting a tension pressure between said armature and corresponding latch on energization of a corresponding magnet, means for selectively actuating said magnets to pivot a selected latch into engagement with a corresponding control ring, said tension pressure retaining the selected latch in said engagement irrespective of the operated position of the armature corresponding to the selected magnet, motor drive means for said control rings, and switch means including an actuating magnet, actuation of said switch serving to energize said motor and rotate said control rings to a stop position at which the tip of a selected latch is in alignment with the stop portion in a corresponding ring, said actuating magnet being in series connection with each of said operating magnets.

13. In a radio tuner having a frame, a rotary member with a plurality of adjustable stops thereon mounted on said frame and an electric motor for driving said rotary member, means for changing the direction of rotation of the motor and stopping said rotary member at predetermined stop positions, said means including a plurality of pivoted latches, a single pivot member for all of said latches, each of said latches having a stop portion on one side of the pivotal axis therefor with all of said stop portions being substantially identical in configuration and having a radial portion on the other side of said pivotal axis including an integral armature portion, with the radial portions on half of said plurality of latches being of varying lengths and having the armature portions therefor extending in the same direction away therefrom, and with the other half of said plurality of latches having the same corresponding lengths for said radial portions and with the armature portion therefor extending in a direction opposite to that of the first-mentioned armature portions, an energizable magnet mounted on said frame for each of said latches with half of the magnets being mounted in a straight line at right angles to the pivot member for said latches for individually and selectively attracting the corresponding half of the plurality of latches at the armature portion for each latch, and the other half being mounted on said frame in a similar position spaced therefrom for selectively and individually attracting the other half of the latches at the armature portion therefor, with said latch configuration and magnet positioning permitting said plurality of latches to be mounted and operated in a restricted space.

14. In a radio tuner having a frame, a rotary member with a plurality of adjustable stops thereon mounted on said frame and an electric motor for driving said rotary member, means for changing the direction of rotation of the motor and stopping said rotary member at predetermined stop positions, said means including a plurality of pivoted latches, a single pivot member for all of said latches, each of said latches having a stop portion on one side of the pivotal axis therefor with all of said stop portions being substantially identical in configuration and having a radial portion on the other side of said pivotal axis including an integral armature portion, with alternate latches having the radial portion thereof extending substantially at right angles to the radial portion for the remainder of said latches, an energizable magnet mounted on said frame for each of said latches with the magnets corresponding to said alternate latches mounted on said frame at right angles to the magnets for the remainder of the latches, with said latch configuration and magnet positioning permitting said plurality of latches to be mounted and operated in a restricted space.

15. In a radio tuning device, a rotary control ring having a pair of oppositely extending circumferential control surfaces of different radial heights and a stop recess intermediate the same, means for causing the rotation of said rotary member and also stopping the same, including a pivoted first latch having an actuating portion on one side of the pivotal axis therefor and a stopping portion on the other side of said axis with a tip at the end thereof, and a supplementary latch pivotally mounted upon the stop portion of said first latch adjacent the end thereof, with said supplementary latch including a plurality of radial arms with one of said arms being supplementary to the tip of said stop portion and increasing the effective width thereof, and a second arm acting to limit the angular pivotal movement of said supplementary latch with reference to the first latch.

16. In electrically operated radio tuning apparatus including an electric driving motor, a control switch therefor, and a rotary control member driven by said motor having a pair of engageable surfaces for determining the direction of rotation of said motor and an adjustable stop recess intermediate said surfaces, the combination of a pivoted latch having a stop tip at one end thereof and an armature portion at the other end with the pivotal axis intermediate said ends, an energizable magnet for attracting the armature portion of the latch and pivoting the stop tip into engagement with the control member, a trigger pivotally mounted at the stop tip end of said latch having a radial portion supplementary to said stop tip and increasing the effective width thereof with said combined stop tip and radial portion of said trigger being wider than the stop recess in the rotary control member so as to slide over said recess in one direction of rotation of said rotary control member and with said radial portion of said trigger being adapted to engage a side of said stop recess on the other direction of rotation of said rotary control member, with said trigger having a radial trip portion operatively connected with the control switch and adapted to be disengaged from said operative connection upon engagement of said pivoted trigger and the side of the stop recess.

17. In radio tuning control apparatus having a rotary control member, a plurality of latches in a co-axial assembly and pivotally mounted upon a stationary pivot member, a control switch at each axial end of the latch assembly, means for operatively connecting all of said latches with said two switch means including a gate having a body portion pivotally supported upon the stationary pivot member, a first flange at right angles to the body portion of the gate and parallel to said pivot member and a second flange in a plane parallel to the plane of the body portion of said gate, said gate being pivoted intermediate the two switch means and having an insulating member secured to the first flange with an extension at each end thereof for operative connection with a corresponding switch means, and means on each latch operatively connected with the second flange on said gate.

18. In a radio tuning apparatus, having rotary control means and a reversible electric motor, the combination of a plurality of independently pivoted selector members, and a multi-leaf electric switch electrically connected with said motor, said switch having conducting leaves and insulating leaves, with one of said insulating leaves being common to and in direct engagement with all of said pivoted selector members, and with said one insulating leaf being operatively connected with at least two of said conducting leaves of said switch, with said one insulating leaf being movable upon pivotal movement of each of said selector members.

19. Radio tuning apparatus including in combination a plurality of control rings with each ring having a stop portion thereon intermediate peripheral portions of different radial heights, a plurality of pivoted latches corresponding to said control rings and each latch having a tip thereon for mechanical engagement with the stop portion of a corresponding control ring, high speed reversible drive means for driving said control rings in either a clockwise or counter-clockwise direction, a reversing switch operatively connected with said latches and electrically connected with said drive means, said switch being movable to an operating position in response to the position of a selected latch relative to said peripheral portions so that mechanical stopping engagement between a control ring and its corresponding latch is always accomplished with the control ring moving in the same direction.

20. Motor driven electric control apparatus having a relatively narrow axial width and including in combination, a plurality of control members arranged in an axial assembly rotatable by a motor as a unit, each member having a peripheral edge with a stop portion thereon, a plurality of individually pivoted units corresponding to said control members assembled to an axial width substantially the same as the axial width of the control members assembly, an energizable magnet for each pivoted unit, and an electric control switch in a stack formation and of a width substantially the same as the axial width of the member and the unit assemblies, said switch having at least one yieldable part mechanically common to all pivoted units, each of said pivoted units including a plurality of operating portions spaced radially from the axial pivot point thereof, with one of said operating portions engageable with the periphery of a corresponding control member upon pivoting of said unit and adapted to cooperate with the stop portion thereon to mechanically stop the control member at a predetermined position, with a second operating portion attractable by the corresponding magnet upon energization thereof to pivot the unit, and with a third operating portion in engagement with said yieldable common part of said switch to move said part and operate said switch when said magnet is energized and said unit is pivoted.

21. Electrically operated control apparatus including in combination a rotary control member having a high peripheral portion and a low peripheral portion with a stop recess therebetween, a unit pivotally mounted relative to said control member and having a stop portion thereon so that said portion selectively moves into mechanical engagement with the periphery thereof and with said stop recess, reversible drive means for driving said control member, a reversing switch operatively connected with said unit and electrically connected with said drive means, and an energizable magnet for pivoting said unit to operate said switch, said switch being moved to a drive-means-operating position in response to the pivoting of the stop portion of said unit into engagement with a peripheral portion of said control member, with said stop portion always engaging said low portion of said periphery prior to completion of rotation of said control member and moving into said stop recess from said low portion, and with said switch being in an operating position corresponding to the position of said unit.

22. Electrically operated control apparatus including in combination a rotary control member having a high peripheral portion and a low peripheral portion with a stop recess therebetween, a unit pivotally mounted relative to said control member and having a stop portion thereon selectively movable with said unit into mechanical engagement with the periphery thereof and with said stop recess, said pivoted unit having an operating portion spaced radially from the pivot point thereof, an electric control switch operatively connected with said operating portion and operated thereby upon pivotal movement of said unit, another operating portion on said unit spaced radially from the pivot point thereof, energizable magnet means for pivoting said unit and said stop portion therewith into a selected engagement, and means for mechanically connecting said magnet and said another operating portion including movable armature means mounted on said magnet means, and including a yieldable portion, said yieldable portion permitting said armature to be attracted to said magnet means upon energization thereof and retaining said stop portion of said unit selectively in engagement with either of said peripheral portions or said stop recess.

HAROLD F. ELLIOTT.